(12) United States Patent
Tomoda

(10) Patent No.: US 7,939,591 B2
(45) Date of Patent: May 10, 2011

(54) POLYCARBONATE RESIN COMPOSITION

(75) Inventor: Takuya Tomoda, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 81 days.

(21) Appl. No.: 11/920,636

(22) PCT Filed: May 18, 2006

(86) PCT No.: PCT/JP2006/310412
§ 371 (c)(1),
(2), (4) Date: Nov. 19, 2007

(87) PCT Pub. No.: WO2006/123833
PCT Pub. Date: Nov. 23, 2006

(65) Prior Publication Data
US 2009/0118406 A1 May 7, 2009

(30) Foreign Application Priority Data

May 19, 2005  (JP) .................... 2005-146896
May 19, 2005  (JP) .................... 2005-146897

(51) Int. Cl.
*C08K 5/00* (2006.01)
*C08K 3/22* (2006.01)

(52) U.S. Cl. ........ 524/284; 524/261; 524/418; 524/497; 524/520; 524/537; 524/544; 524/545; 524/546; 423/612

(58) Field of Classification Search .......... 524/284, 524/537, 261, 287, 418, 497, 520, 544, 545, 524/546
See application file for complete search history.

(56) References Cited

U.S. PATENT DOCUMENTS

| 4,221,728 | A | 9/1980 | Jaquiss et al. | |
|---|---|---|---|---|
| 6,362,269 | B1 * | 3/2002 | Ishihata et al. | 524/449 |
| 6,476,158 | B1 | 11/2002 | England et al. | |
| 6,664,313 | B2 * | 12/2003 | Hirai et al. | 523/209 |
| 2002/0111409 | A1 | 8/2002 | Talibuddin | |
| 2004/0232598 | A1 | 11/2004 | Donea et al. | |

FOREIGN PATENT DOCUMENTS

| JP | 57-036156 | | 2/1982 |
|---|---|---|---|
| JP | 63-26140 | | 5/1988 |
| JP | 02-038449 | | 2/1990 |
| JP | 06207092 | A * | 7/1994 |
| JP | 08-012869 | | 1/1996 |
| JP | 08012869 | A * | 1/1996 |
| JP | 09-003211 | | 1/1997 |
| JP | 11-060743 | | 3/1999 |
| JP | 2002-080709 | | 3/2002 |
| JP | 2002-294063 | | 10/2002 |
| JP | 2002-372609 | | 12/2002 |
| JP | 2003-183491 | | 7/2003 |
| JP | 2003-213114 | | 7/2003 |
| JP | 2003-226805 | | 8/2003 |
| JP | 2003-342462 | | 12/2003 |
| JP | 2004-161888 | | 6/2004 |
| JP | 2005-290137 | | 10/2005 |
| JP | 2005-344020 | | 12/2005 |
| WO | 00/24828 | | 5/2000 |
| WO | 00/55249 | | 9/2000 |
| WO | 03/054085 | | 7/2003 |
| WO | 2004/076560 | | 9/2004 |

OTHER PUBLICATIONS

Machine translation of Sato et al, JP08012869A.*
Machine translation of Ohira et al., JP06207092A.*
Written Opinion of the International Searching Authority issued Nov. 19, 2007 in International (PCT) Application No. PCT/JP2006/310412 of which the present application is the U.S. National Stage.
Database WPI Week 200614, Derwent Publications Ltd., London, GB; AN 2006-136423, XP002481500, & WO 2006/008858, Jan. 26, 2006.
Chinese Office Action issued Jun. 21, 2010 in corresponding Chinese Application No. 200680017343.2, in the English language.

* cited by examiner

*Primary Examiner* — Mark Eashoo
*Assistant Examiner* — Nicole M Buie-Hatcher
(74) *Attorney, Agent, or Firm* — Wenderoth, Lind & Ponack LLP.

(57) ABSTRACT

The present disclosure relates to a resin composition having excellent thermal stability, light reflectivity and color, and, preferably, flame retardancy. The present disclosure also relates to a method for producing a resin composition which comprises mixing 60 to 99.9 parts by weight of polycarbonate resin (component A) with 0.1 to 40 parts by weight of titanium dioxide pigment (component B), wherein component B (i) satisfies $0.05 \leq (b)-(a) \leq 0.6$, when weight. reduction at 23 to 100° C. by thermogravimetric analysis (TGA) is (a) wt % and weight reduction at 23 to 300° C. by TGA is (b) wt %, and (ii) satisfies $0.001 \leq (d)/(c) \leq 0.01$ and $0.001 \leq (e)/(c) \leq 0.02$, when weight percentages derived from Ti, Al and Si elements in X-ray fluorescence analysis are (c) wt %, (d) wt % and (e) wt %, respectively.

13 Claims, 1 Drawing Sheet

POLYCARBONATE RESIN COMPOSITION

FIELD OF THE INVENTION

The present invention relates to a resin composition comprising a polycarbonate resin and a titanium dioxide pigment. More specifically, it relates to a resin composition which is excellent in thermal stability and color.

BACKGROUND ART

Polycarbonate resins are widely used in electrical, mechanical, automotive and medical applications because they have excellent transparency, heat resistance and mechanical strength. In recent years, a resin composition having a titanium dioxide pigment filled in a polycarbonate resin and having excellent light reflectivity has been proposed. Molded articles prepared from this resin composition are used for a reflector for a backlight of a liquid crystal display, a reflector for an illuminating push switch or optoelectronic switch, a display inner frame of a vending machine, a stroboscopic reflector, and the like.

This resin composition is required to have excellent light reflectivity, a high degree of whiteness and excellent color. Further, along with a reduction in the thickness and size of molded article, the resin composition is required to have thermal stability which enables it to endure high-speed and high-temperature injection molding. That is, it is required to have no yellowing and silver streaks which are caused by thermal degradation at the time of molding. The yellowing degrades light reflectivity, and it is assumed that the silver streaks do not exist on molded articles in the first place. Further, resin compositions used for light reflectors are often required to have flame retardancy. In this case, it is often required not to use a bromine flame retardant and a phosphorus flame retardant so as to reduce environmental burdens.

Various proposals have been made to improve the thermal stability and flame retardancy of a resin composition containing a titanium dioxide pigment. For example, Patent Literature 1 proposes coating the surface of a titanium dioxide pigment for a polymer composition with aluminum oxide and organosiloxane to prevent yellowing of the titanium dioxide pigment. Patent Literature 2 proposes adding a titanium dioxide pigment surface-treated with aluminum oxide to a polycarbonate resin to improve the surface appearance and coatability of the resin composition. Patent Literature 3 proposes adding polyorgano hydrogen siloxane to improve the thermal stability of a resin composition comprising an aromatic polycarbonate resin and a titanium dioxide pigment. Patent Literature 4 proposes a resin composition which comprises an aromatic polycarbonate resin, a titanium dioxide pigment containing a specific amount of aluminum oxide and a metal salt and has excellent light reflectivity and heat resistance. Patent Literature 5 proposes a light reflector which comprises a polycarbonate resin, an alkali metal salt of perfluoroalkane sulfonic acid and a titanium dioxide pigment and has excellent heat resistance and total light reflectance. Patent Literature 6 proposes a resin composition which comprises an aromatic polycarbonate resin, a glass filler, titanium oxide and organic sulfonic acid and has excellent flame retardancy, strength and rigidity. Patent Literature 7 proposes a resin composition which comprises an aromatic polycarbonate resin, titanium oxide, silica, polyorganosiloxane and polytetrafluoroethylene, is suitable for a reflector and has excellent flame retardancy. Patent Literature 8 proposes a resin composition which comprises an aromatic polycarbonate resin, other thermoplastic resin, titanium oxide, a metal salt and a fluoropolymer and has excellent flame retardancy and impact resistance.

(Patent Literature 1) JP-B 60-3430
(Patent Literature 2) JP-A 11-60743
(Patent Literature 3) JP-B 63-26140
(Patent Literature 4) JP-A 2003-183491
(Patent Literature 5) JP-A 2002-372609
(Patent Literature 6) JP-A 2003-226805
(Patent Literature 7) JP-A 2003-213114
(Patent Literature 8) JP-A 2003-342462

DISCLOSURE OF THE INVENTION

However, there are still rooms for improvements for the thermal stability, light reflectivity, color and flame retardancy of the resin compositions in these proposals. Therefore, an object of the present invention is to provide a method for producing a resin composition which comprises a polycarbonate resin and a titanium dioxide pigment and is excellent in thermal stability, light reflectivity and color, and preferably in flame retardancy.

Another object of the present invention is to provide pellets of a resin composition which is excellent in thermal stability, light reflectivity and color, and preferably in flame retardancy, and a molded article formed from the composition such as a light reflection material.

Still another object of the present invention is to provide a method for preventing a decrease in the molecular weight of a resin composition comprising a polycarbonate resin and a titanium dioxide pigment.

The present inventor has made intensive studies on a method for improving the thermal stability of a polycarbonate resin. As a result, the inventor has found that volatile components in a titanium dioxide pigment have a great influence on the thermal stability of the polycarbonate resin. The volatile components in the titanium dioxide pigment are a component which vaporizes before reaching 100° C. when the titanium dioxide pigment is heated and which comprises weak adsorbed water as a main component and a component which does not vaporize before reaching 100° C. The present inventor has found that of these, the former has little adverse effect on a resin composition because it easily comes off when the titanium dioxide pigment is added to and melt-kneaded with the polycarbonate resin to prepare the resin composition, while the latter is liable to remain in the resin composition and deteriorate the resin composition.

Further, the present inventor has found that the amounts of aluminum compound and silicone compound to be coated on the titanium dioxide pigment must be within predetermined ranges and the active spot of titanium dioxide must be stabilized so as to improve the thermal stability of the resin composition.

As a result, the present inventor has found that a resin composition having excellent thermal stability, light reflectivity and color can be produced by adding a titanium dioxide pigment having volatile components, an Al element and an Si element within predetermined ranges to a polycarbonate resin. The present inventor has completed the present invention based on this finding.

That is, the present invention is a method for producing a resin composition which comprises mixing 60 to 99.9 parts by weight of polycarbonate resin (component A) with 0.1 to 40 parts by weight of titanium dioxide pigment (component B), the component B (i) satisfying $0.05 \leq (b)-(a) \leq 0.6$, when weight reduction at 23 to 100° C. by thermogravimetric analysis (TGA) is (a) wt % and weight reduction at 23 to 300° C. by TGA is (b) wt %, and (ii) satisfying $0.001 \leq (d)/(c) \leq 0.01$ and $0.001 \leq (e)/(c) \leq 0.02$, when weight percentages derived from Ti, Al and Si elements in X-ray fluorescence analysis are (c) wt %, (d) wt % and (e) wt %, respectively.

It is supposed that the weight reduction behavior in the condition (i) is based on surface adsorbed water and crystal water and hydrated water which originate from a surface treatment agent. It is supposed that the weight reduction at 23 to 100° C. is based on weakly physically adsorbed water which is in equilibrium at relative humidity in the air and the adsorbed water has little adverse effect on the polycarbonate resin since it easily comes off when melt-kneaded with the polycarbonate resin. Meanwhile, it is supposed that the weight reduction at 100° C. or higher is based on strongly physically adsorbed water and crystal water and hydrated water which originate from a surface treatment agent. Water derived from this weight reduction at 100° C. or higher is liable to come off at high temperatures and induce decomposition of the polycarbonate resin. It is supposed that the decomposition causes silver streaks at the time of molding.

Meanwhile, the weight percentages of the elements quantified by X-ray fluorescence analysis in the condition (ii) define the ranges of the proper amounts of an aluminum compound and a silicone compound. These compounds become portions in which chemically adsorbed water exists and are coated on the surface of $TiO_2$ to stabilize the active spot of $TiO_2$. Accordingly, when surface coating with these compounds is insufficient, the color of the resin composition is deteriorated, inter alia, light reflectivity is deteriorated at the time of high contents, while when the surface coating is excessive, it becomes difficult to satisfy the above condition (i), and thermal stability is deteriorated.

The present invention includes a resin composition obtained by the above method and molded articles formed from the resin composition such as a light reflection material.

Further, the present invention includes pellets which comprise a resin composition comprising 60 to 99.9 parts by weight of polycarbonate resin (component A) and 0.1 to 40 parts by weight of titanium dioxide pigment (component B), the component B in the pellets (i) satisfying $0.05 \leq (b)-(a) \leq 0.25$, when weight reduction at 23 to 100° C. by thermogravimetric analysis (TGA) is (a) wt % and weight reduction at 23 to 300° C. by TGA is (b) wt %, and (ii) satisfying $0.001 \leq (d)/(c) \leq 0.01$ and $0.001 \leq (e)/(c) \leq 0.02$, when weight percentages derived from Ti, Al and Si elements in X-ray fluorescence analysis are (c) wt %, (d) wt % and (e) wt %, respectively.

Further, the present invention includes a molded article obtained by molding a resin composition comprising 60 to 99.9 parts by weight of polycarbonate resin (component A) and 0.1 to 40 parts by weight of titanium dioxide pigment (component B), the component B (i) satisfying $0.001 \leq (d)/(c) \leq 0.01$ and $0.001 \leq (e)/(c) \leq 0.02$, when weight percentages derived from Ti, Al and Si elements in X-ray fluorescence analysis are (c) wt %, (d) wt % and (e) wt %, respectively, and having a silver occurrence rate of lower than 10%.

Further, the present invention includes a method for preventing a decrease in the molecular weight of a resin composition comprising a polycarbonate resin (component A) and a titanium dioxide pigment (component B), the composition using, as the component B, a titanium dioxide pigment which:

(i) satisfies $0.05 \leq (b)-(a) \leq 0.6$, when weight reduction at 23 to 100° C. by thermogravimetric analysis (TGA) is (a) wt % and weight reduction at 23 to 300° C. by TGA is (b) wt %, and (ii) satisfies $0.001 \leq (d)/(c) \leq 0.01$ and $0.001 \leq (e)/(c) \leq 0.02$, when weight percentages derived from Ti, Al and Si elements in X-ray fluorescence analysis are (c) wt %, (d) wt % and (e) wt %, respectively.

Figure 1:
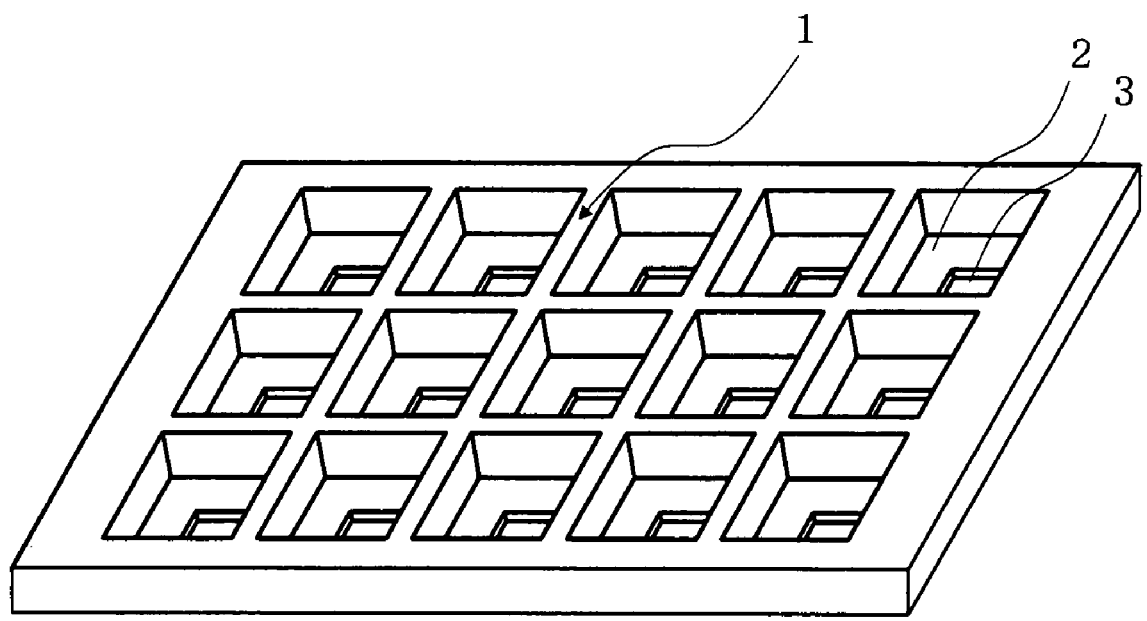
FIG. 1 is a schematic perspective view of a light reflector for an LED array backlight prepared in an example.

EXPLANATIONS OF LETTERS OR NOTATIONS 1. main body of a light reflector (length of 60 mm, width of 40 mm, height of 4 mm)
2. each block of LED (depth of 2.5 mm, internal surface of recess is planished.)
3. recess for fixing LED

BEST MODE FOR CARRYING OUT THE INVENTION

<Production Method of Resin Composition>

The present invention is a method for producing a resin composition which comprises mixing 60 to 99.9 parts by weight of polycarbonate resin (component A) with 0.1 to 40 parts by weight of titanium dioxide pigment (component B). Components which are preferably mixed in other than the components A and B include a component C, a component D and a component E. Further, the present invention includes a resin composition obtained by this production method. Hereinafter, the components A to E will be described.

(Component A)

The component A in the present invention is a polycarbonate resin. A typical polycarbonate resin (hereinafter may be simply referred to as "polycarbonate") is one obtained by reacting a dihydric phenol with a carbonate precursor. Illustrative examples of the reaction method include interfacial polycondensation, melt transesterification, solid-phase transesterification of carbonate prepolymer, and ring-opening polymerization of cyclic carbonate compound.

Specific examples of the above dihydric phenol include hydroquinone, resorcinol, 4,4'-biphenol, 1,1-bis(4-hydroxyphenyl)ethane, 2,2-bis(4-hydroxyphenyl)propane (commonly known as bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene, and 9,9-bis(4-hydroxy-3-methylphenyl)fluorene. Of these, bis(4-hydroxyphenyl)alkane, particularly bisphenol A (hereinafter may be abbreviated to as "BPA"), is widely used.

In the present invention, in addition to a bisphenol A based polycarbonate which is a widely used polycarbonate, a special polycarbonate produced by using other dihydric phenol can be used as the component A.

For example, a polycarbonate (homopolymer or copolymer) using, as a part or all of the dihydric phenol component, 4,4'-(m-phenylenediisopropylidene)diphenol (hereinafter may be abbreviated as "BPM"), 1,1-bis(4-hydroxyphenyl)cyclohexane, 1,1-bis(4-hydroxyphenyl)-3,3,5-trimethylcyclohexane (hereinafter may be abbreviated as "Bis-TMC"), 9,9-bis(4-hydroxyphenyl)fluorene and 9,9-bis(4-hydroxy-3-methylphenyl)fluorene (hereinafter may be abbreviated as "BCF"), is suited for applications in which requirements for a dimensional change caused by water absorption and morphological stability are particularly stringent. These dihydric phenols other than BPA are preferably used in an amount of 5 mol % or larger, particularly preferably 10 mol % or larger, of the whole dihydric phenol component constituting the polycarbonate.

In particular, when high rigidity and better hydrolysis resistance are required, it is particularly suitable that the component A which constitutes the resin composition is any of the following copolymerized polycarbonates (1) to (3).
(1) copolymerized polycarbonate in which BPM accounts for 20 to 80 mol % (more suitably 40 to 75 mol %, much more suitably 45 to 65 mol %) and BCF accounts for 20 to 80 mol % (more suitably 25 to 60 mol %, much more suitably 35 to 55 mol %) out of 100 mol % of the dihydric phenol component constituting the polycarbonate.
(2) copolymerized polycarbonate in which BPA accounts for 10 to 95 mol % (more suitably 50 to 90 mol %, much more suitably 60 to 85 mol %) and BCF accounts for 5 to 90 mol % (more suitably 10 to 50 mol %, much more suitably 15 to 40 mol %) out of 100 mol % of the dihydric phenol component constituting the polycarbonate.
(3) copolymerized polycarbonate in which BPM accounts for 20 to 80 mol % (more suitably 40 to 75 mol %, much more suitably 45 to 65 mol %) and Bis-TMC accounts for 20 to 80 mol % (more suitably 25 to 60 mol %, much more suitably 35 to 55 mol %) out of 100 mol % of the dihydric phenol component constituting the polycarbonate.

These special polycarbonates may be used alone or in admixture of two or more as appropriate. Further, these may be used as a mixture with the widely used bisphenol A based polycarbonate.

Production methods and characteristics of these special polycarbonates are described in detail in, for example, JP-A 6-172508, JP-A 8-27370, JP-A 2001-55435 and JP-A 2002-117580.

Of the above various polycarbonates, polycarbonates having a water absorption percentage and Tg (glass transition temperature) within the following ranges as a result of adjustment of copolymerization composition and the like are particularly suitable for fields in which morphological stability is required, because the polymers have good hydrolysis resistance and undergo exceptionally small warpage after molding.
(i) polycarbonate having a water absorption percentage of 0.05 to 0.15%, preferably 0.06 to 0.13%, and a Tg of 120 to 180° C., or
(ii) polycarbonate having a Tg of 160 to 250° C., preferably 170 to 230° C., and a water absorption percentage of 0.10 to 0.30%, preferably 0.13 to 0.30%, more preferably 0.14 to 0.27%.

The water absorption percentage of the polycarbonate is a value obtained by measuring the moisture percentage of a disk-shaped test piece having a diameter of 45 mm and a thickness of 3.0 mm after immersing the test piece in water at 23° C. for 24 hours in accordance with ISO62-1980. Further, Tg (glass transition temperature) is a value obtained by differential scanning calorimeter (DSC) measurement according to JIS K7121.

Meanwhile, as the carbonate precursor, carbonyl halide, carbonate ester or haloformate is used. Specific examples thereof include phosgene, diphenyl carbonate, and dihaloformate of dihydric phenol.

When the polycarbonate is produced from the above dihydric phenol and carbonate precursor by interfacial polymerization, a catalyst, a terminal blocking agent, an antioxidant for preventing oxidation of the dihydric phenol, and the like may be used as required. Further, the polycarbonate may be a branched polycarbonate copolymerized with a polyfunctional aromatic compound having three or more functional groups. Illustrative examples of the polyfunctional aromatic compound having three or more functional groups include 1,1,1-tris(4-hydroxyphenyl)ethane and 1,1,1-tris(3,5-dimethyl-4-hydroxyphenyl)ethane.

Constitutional units derived from the polyfunctional aromatic compound in the branched polycarbonate resin account for 0.03 to 1 mol %, preferably 0.07 to 0.7 mol %, particularly preferably 0.1 to 0.4 mol %, out of 100 mol % of the total of constitutional units derived from the dihydric phenol and the constitutional units derived from the polyfunctional aromatic compound.

Further, the branched structure units may be not only derived from the polyfunctional aromatic compound but also derived without using the polyfunctional aromatic compound, e.g. from a side reaction at the time of melt transesterification reaction. The proportion of the branched structure units can be calculated by $^1$H-NMR measurement.

Further, the polycarbonate in the present invention may be a polyester carbonate copolymerized with an aromatic or aliphatic (including alicyclic) difunctional carboxylic acid, a copolymerized polycarbonate copolymerized with a difunctional alcohol (including alicyclic), or a polyester carbonate copolymerized with the difunctional carboxylic acid and the difunctional alcohol. Further, the polycarbonate in the present invention may be a mixture of two or more of polycarbonates obtained.

The above aliphatic difunctional carboxylic acid is preferably $\alpha,\omega$-dicarboxylic acid. Preferred examples of the aliphatic difunctional carboxylic acid include linear saturated aliphatic carboxylic acids such as sebacic acid (decanedioic acid), dodecanedioic acid, tetradecanedioic acid, octadecanedioic acid and icosanedioic acid, and alicyclic dicarboxylic acids such as cyclohexane dicarboxylic acid. As the difunctional alcohol, an alicyclic diol is more suitable. Illustrative examples thereof include cyclohexane dimethanol, cyclohexane diol, and tricyclodecane dimethanol.

Further, in the present invention, as the component A, a polycarbonate-polyorganosiloxane copolymer copolymerized with a polyorganosiloxane unit can also be used.

The polycarbonate as the component A may be a mixture of two or more of various polycarbonates such as the above polycarbonates comprising different dihydric phenols, polycarbonates containing branch components, polyester carbonates and polycarbonate-polyorganosiloxane copolymer. Further, a mixture of two or more of polycarbonates produced by different methods and polycarbonates using different terminal blocking agents can also be used.

The viscosity average molecular weight of the polycarbonate resin as the component A is not limited. However, when the viscosity average molecular weight is lower than $1 \times 10^4$, strength and the like deteriorate, while when it is higher than $5 \times 10^4$, moldability deteriorates. Thus, the viscosity average molecular weight is preferably $1 \times 10^4$ to $5 \times 10^4$, more preferably $1.2 \times 10^4$ to $3 \times 10^4$, much more preferably $1.5 \times 10^4$ to $2.8 \times 10^4$. In this case, it is also possible to mix a polycarbonate whose viscosity average molecular weight is out of the above range as long as moldability and the like are retained. For example, a high-molecular-weight polycarbonate whose viscosity average molecular weight is higher than $5 \times 10^4$ may be mixed in.

The viscosity average molecular weight in the present invention is determined in the following manner. First, specific viscosity ($\eta_{sp}$) calculated by the following formula:

Specific Viscosity($\eta_{sp}$)=$(t-t_0)/t_0$

[$t_0$ is the number of seconds for dropping methylene chloride, t is the number of seconds for dropping sample solution], is determined from a solution prepared by dissolving 0.7 g of aromatic polycarbonate in 100 ml of methylene chloride at 20° C. by using an Ostwald viscometer, and viscosity average molecular weight M is calculated from the determined specific viscosity ($\eta_{sp}$) by the following formula:

$\eta_{sp}/c = [\eta] + 0.45 \times [\eta]^2 c$ ([$\eta$] is intrinsic viscosity.)

$[\eta] = 1.23 \times 10^{-4} M^{0.83}$ c=0.7

The viscosity average molecular weight in the polycarbonate resin composition is calculated in the following manner. That is, the composition is mixed with methylene chloride whose weight is 20 to 30 times the weight of the composition to dissolve soluble parts in the composition. The soluble parts are collected by sellite filtration. Then, the solvent is removed from the obtained solution. A solid resulting from removal of the solvent is fully dried to obtain a solid component which dissolves in methylene chloride. Specific viscosity at 20° C. is determined from a solution prepared by dissolving 0.7 g of the solid in 100 ml of methylene chloride in the same manner as described above, and viscosity average molecular weight M is calculated from the specific viscosity in the same manner as described above.

(Component B)

The component B in the present invention (i) satisfies $0.05 \leq (b)-(a) \leq 0.6$, when weight reduction at 23 to 100° C. by thermogravimetric analysis (TGA) is (a) wt % and weight reduction at 23 to 300° C. by TGA is (b) wt %, and (ii) satisfies $0.001 \leq (d)/(c) \leq 0.01$ and $0.001 \leq (e)/(c) \leq 0.02$, when weight percentages derived from Ti, Al and Si elements in X-ray fluorescence analysis are (c), (d) and (e), respectively.

The lower limit of the value of (b)-(a) is preferably 0.15, and its upper limit is preferably 0.5. The lower limit of (d)/(c) is preferably 0.003, and its upper limit is preferably 0.01. The lower limit of (e)/(c) is preferably 0.005, and its upper limit is preferably 0.015. (b)-(a) preferably satisfies $0.05 \leq (b)-(a) \leq 0.5$, more preferably $0.05 \leq (b)-(a) \leq 0.4$, much more preferably $0.05 \leq (b)-(a) \leq 0.3$.

A titanium dioxide pigment whose (b)-(a) is larger than 0.6, (d)/(c) is larger than 0.01 or (e)/(c) is larger than 0.02 has a decomposition effect on the polycarbonate resin and is liable to make the thermal stability of the resin composition unsatisfactory. A titanium dioxide pigment whose (b)-(a) is smaller than 0.05 or (d)/(c) or (e)/(c) is smaller than 0.001 has a degeneration effect on the polycarbonate resin and is liable to deteriorate the color of the resin composition, especially light reflectivity at the time of high contents.

Measurement by thermogravimetric analysis (TGA) in the above condition (i) is conducted under a measurement condition in which the temperature is increased from 23° C. to 900° C. at a temperature increasing rate of 20° C./min in a nitrogen gas atmosphere in a TGA measuring device. As for calculations of the weight percentages of the elements from X-ray fluorescence analysis in the above condition (II), the weight percentage of each element can be generally calculated based on a calibration line calculated from the weight of the element and peak intensity which are determined from a sample of the element. In recent years, a program capable of quantitative determination is built in a X-ray fluorescence analysis device, and the weight percentage of the element can be determined from the device directly. An example of the device is MESA-500 of HORIBA Ltd., and this can be suitably used for calculations of the weight percentages of the elements. The calculations are performed in accordance with a basic parameter method in MESA-500.

Titanium oxide ($TiO_2$) used in the present invention may be anatase-type crystals or rutile-type crystals, and these crystals can be mixed together as required and used. The rutile-type crystals are more preferred in view of initial mechanical properties and long-term weather resistance. Further, the anatase-type crystals may be contained in the rutile-type crystals. Further, although $TiO_2$ can be produced by a sulfuric acid method, a chlorine method or various other methods, the chlorine method is more preferred.

Further, the shape of titanium oxide in the present invention is not particularly limited. However, particulate titanium oxide is more suitable. The average particle diameter of titanium oxide is preferably 0.01 to 0.4 μm, more preferably 0.1 to 0.3 μm, much more preferably 0.15 to 0.25 μm. The average particle diameter is calculated by measuring and averaging the particle diameters of individual particles observed under an electron microscope.

To coat the surface of $TiO_2$ with various metal oxides, a variety of commonly practiced methods can be used. For example, metal-oxide-coated $TiO_2$ is produced by a method comprising the following steps 1) to 8), i.e. 1) preparing aqueous slurry of dry-milled, untreated $TiO_2$, 2) wet-milling the slurry to atomize it, 3) collecting the fine slurry, 4) adding a water-soluble compound of a metal salt to the fine slurry, 5) neutralizing it to coat the surface of $TiO_2$ with an aqueous metal oxide, 6) conducting removal of a side product, adjustment of the pH of the slurry, filtration, and cleaning with pure water, 7) drying the cleaned cake, and 8) milling the dried cake by a jet mill or the like. In addition, a method of reacting an active metal compound with $TiO_2$ particles in a vapor phase may be used, for example. Further, as to coating of the surface of $TiO_2$ with the metal oxide surface treatment agent, it is possible to bake $TiO_2$ after a surface treatment, to subject $TiO_2$ to another surface treatment after a surface treatment or to bake $TiO_2$ after a surface treatment and then subject $TiO_2$ to another surface treatment. Further, as the surface treatment with a metal oxide, a high-density treatment or a low-density (porous) treatment can be selected.

The above conditions (i) and (ii) can be adjusted by adjustment of the metal oxide for the surface treatment and conditions for the baking treatment therefor. The titanium dioxide pigment used in the present invention is surface-treated with aluminum oxide and silicon oxide, as is obvious from the conditions. The titanium dioxide pigment may be surface-treated with aluminum oxide first and then with silicon oxide or vice versa or with a mixture of these oxides. However, the titanium dioxide pigment is preferably surface-treated with aluminum oxide first and then with silicon oxide. The titanium dioxide pigment in the present invention may be surface-treated with metal oxides other than the above metal oxides. Illustrative examples of metals in the other metal oxides include titanium, zirconium, antimony, tin and zinc.

Further, these metal oxide components for the surface treatment may partially exist inside $TiO_2$ particles.

Further, the titanium dioxide pigment as the component B may be surface-treated with an organic compound. As the surface treatment agent, various treatment agents such as polyol-based, amine-based and silicone-based surface treatment agents can be used. Illustrative examples of the polyol-based surface treatment agent include pentaerythritol, trimethylolethane and trimethylolpropane. Illustrative examples of the amine-based surface treatment agent include triethanolamine acetate, and trimethylolamine acetate. Illustrative examples of the silicone-based surface treatment agent include a halogen-substituted organosilicon compound, and an organosilicon compound containing an alkoxy group and/or an Si—H group. In particular, the latter organosilicon compound is preferred. Illustrative examples of the halogen-substituted organosilicon compound include alkylchlorosilane. Illustrative examples of the organosilicon compound containing an alkoxy group and/or an Si—H group include alky alkoxysilane, alkyl alkoxysiloxane, and alkyl hydrogen siloxane. These silane compounds and siloxane compounds may have a part of the alkyl group substituted with a phenyl group. However, the alkyl group is more preferably not substituted with a phenyl group. The alkyl group preferably has 1 to 30, more preferably 1 to 12 carbon atoms. The alkoxy group is preferably an alkoxy group having 1 to 4 carbon atoms, and a methoxy group in particular is suitable.

The alkyl alkoxysilane compound may contain 1 to 3 alkoxy groups or may be a mixture of alkyl alkoxysilane compounds containing 1 to 3 alkoxy groups. The alkyl alkoxysilane compound preferably contains 2 or 3 alkoxy groups, particularly preferably 3 alkoxy groups. Specific examples of the alkyl alkoxysilane compound include methyl trimethoxysilane, ethyl trimethoxysilane, butyl trimethoxysilane, isobutyl trimethoxysilane, methyloctyl dimethoxysilane, decyl trimethoxysilane, and octadecyl trimethoxysilane.

The content of the alkoxy group and Si—H group in the siloxane compound is preferably 1 to 1.2 mol/100 g, more preferably 0.12 to 1 mol/100 g, much more preferably 0.15 to 0.6 mol/100 g. The content can be determined by measuring the amount of hydrogen or alcohol generated per unit weight of the siloxane compound by an alkali decomposition method.

In general, the structure of the siloxane compound is constituted by combining the following four kinds of siloxane units arbitrarily. That is, M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$, D unit: difunctional siloxane unit such as $(CH_3)_2SiO$, $H(CH_3)SiO$, $H_2SiO$, $H(C_6H_5)SiO$, $(CH_3)(CH_2=CH)SiO$ or $(C_6H_5)_2SiO$, T unit: trifunctional siloxane unit such as $(CH_3)SiO_{3/2}$, $(C_3H_7)SiO_{3/2}$, $HSiO_{3/2}$, $(CH_2=CH)SiO_{3/2}$ or $(C_6H_5)SiO_{3/2}$, Q unit: tetrafunctional siloxane unit represented by $SiO_2$.

Specific examples of the structure of the above siloxane compound include $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ and $D_nT_pQ_q$. Of these, preferred structures of the silicone compound are $M_mD_n$, $M_mT_p$, $M_mD_nT_p$ and $M_mD_nQ_g$, and a more preferred structure thereof is $M_mD_n$ or $M_mD_nT_p$.

The coefficients m, n, p and q in the above rational formulas are an integer of 1 or larger which represents the degree of polymerization of each siloxane unit, and the total of the coefficients in each rational formula is the average degree of polymerization of the siloxane compound. This average degree of polymerization is preferably 2 to 150, more preferably 3 to 80. Further, when any of m, n, p and q is a numerical value of 2 or larger, the siloxane unit with the coefficient can be two or more siloxane units differing in hydrogen atoms or organic residues to be bonded.

The amount of the organic compound for the surface treatment is preferably not larger than 1 wt %, more preferably not larger than 0.6 wt %, based on 100 wt % of the component B. Meanwhile, its lower limit is not smaller than 0.05 wt %. The titanium dioxide pigment surface-treated with the organosilicon compound containing an alkoxy group and/or an Si—H group provides better light reflectivity to the resin composition of the present invention.

(Component C)

An acid-group-containing organic compound which is the component C in the present invention is an organic compound having an acid group typified by a carboxyl group, carboxylic anhydride group, sulfonic group, sulfinic group, phosphonic group and phosphinic group. The component C is suitably an organic compound having at least one of a carboxyl group, carboxylic anhydride group, sulfonic group, sulfinic group, phosphonic group and phosphinic group. In particular, an organic compound having at least one acid group selected from a carboxyl group, a carboxylic anhydride group and a phosphonic group is preferred. An organic compound having a carboxyl group and/or a carboxylic anhydride group is particularly preferred.

Further, a suitable embodiment as the component C in the present invention is a lubricant containing the above acid groups and is more suitably a lubricant having at least one of the acid groups enumerated above as examples. A more suitable component C is a lubricant having at least one acid group selected from a carboxyl group, a carboxylic anhydride group and a phosphonic group and is suitably a lubricant having a carboxyl group and/or a carboxylic anhydride group. Particularly suitable is olefinic wax having a carboxyl group and/or a carboxylic anhydride group. The concentration of the acid group in the acid-group-containing organic compound, preferably acid-group-containing lubricant, is 0.05 to 10 meq/g, more preferably 0.1 to 6 meq/g, much more preferably 0.5 to 4 meq/g.

The lubricant refers to a compound which is widely known to reduce friction with an apparatus or a mold or to achieve good mold releasing in molding of plastic. Specific examples thereof include olefinic wax, higher fatty acid (such as an aliphatic carboxylic acid having 16 to 60 carbon atoms), polyalkylene glycol having a polymerization degree of around 10 to 200, silicone oil, and fluorocarbon oil. Specific examples of the olefinic wax include paraffin wax as paraffin waxes, microcrystalline wax, Fischer-Tropsch wax, and an α-olefin polymer. Specific examples of polyethylene wax include a polyethylene or polypropylene having a molecular weight of around 1,000 to 15,000. The molecular weight is a weight average molecular weight calculated on the basis of calibration curve obtained from a standard polystyrene in GPC (gel permeation chromatography).

Illustrative examples of a method of binding carboxyl groups to the lubricants (excluding higher fatty acid) include (a) a method of copolymerizing a monomer having the carboxyl group with an α-olefin monomer and (b) a method of binding or copolymerizing a compound or monomer having the carboxyl group with the above lubricant.

In the above method (a), in addition to radical polymerization such as solution polymerization, emulsion polymerization, suspension polymerization or bulk polymerization, living polymerization can also be employed. Further, a method of conducting polymerization after formation of macromonomer can also be used. As for the form of the copolymer, in addition to a random copolymer, copolymers of various forms such as an alternating copolymer, a block copolymer and a tapered copolymer can be used. In the above method (b), a method of adding a radical generator such as a peroxide or 2,3-dimethyl-2,3-diphenylbutane (commonly known as "dicumyl") to the lubricant, especially olefinic wax, as required to conduct a reaction or copolymerization at high temperatures can be employed. The method thermally generates a reaction active spot in the lubricant and causes a compound or monomer which reacts with the active spot to react. Another method of generating the active spot required for the reaction is a method such as irradiation with radiation or an electron beam or application of external force by a mechanochemical technique. Still another method is a method of copolymerizing a monomer which generates the active spot required for the reaction in the lubricant in advance. Illustrative examples of the active spot for the reaction include an unsaturated bond and a peroxide bond, and illustrative examples of a method for obtaining the active spot include nitroxide-mediated radical polymerization typified by TEMPO.

Illustrative examples of the above compound or monomer having the carboxyl group include acrylic acid, methacrylic acid, maleic acid, fumaric acid, maleic anhydride, and citraconic anhydride. Maleic anhydride in particular is suitable.

More suitable as the component C is carboxyl-group-containing olefinic wax containing a carboxyl group in an amount of preferably 0.05 to 10 meq/g, more preferably 0.1 to 6 meq/g, much more preferably 0.5 to 4 meq/g, per gram of the carboxyl-group-containing lubricant. The molecular weight of the olefinic wax is preferably 1,000 to 10,000.

A suitable embodiment as the component C is a copolymer of α-olefin and maleic anhydride, and this copolymer is particularly suitable when it satisfies the above carboxyl group content and molecular weight. The copolymer can be produced by melt polymerization or bulk polymerization in the presence of a radical catalyst in accordance with an ordinary method. The α-olefin preferably has 10 to 60 carbon atoms on average. The α-olefin more preferably has 16 to 60 carbon atoms on average, much more preferably 25 to 55 carbon atoms on average.

(Component D)

An alkali (earth) metal sulfonate (component D) in the present invention includes a metal salt of fluorine-substituted alkyl sulfonic acid such as a metal salt of perfluoroalkyl sulfonic acid and an alkali metal or alkaline earth metal and a metal salt of aromatic sulfonic acid and an alkali metal or alkaline earth metal.

Illustrative examples of the alkali metal constituting the component D include lithium, sodium, potassium, rubidium and cesium. Illustrative examples of the alkaline earth metal include beryllium, magnesium, calcium, strontium and barium. More suitable are the alkali metals. Of the alkali metals, rubidium and cesium which have a larger ionic radius are suitable when higher transparency is required. These are not versatile and are difficult to purify, so that they may be disadvantageous in view of costs. On the other hand, metals having a smaller ionic radius such as lithium and sodium may be disadvantageous in view of flame retardancy. In consideration of these, different alkali metals can be used in an alkali metal sulfonate. However, in all aspects, potassium sulfonate having an excellent balance among properties is the most suitable. The potassium salt can be used in combination with an alkali metal sulfonate comprising other alkali metal.

Specific examples of alkali metal perfluoroalkyl sulfonate include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate, and rubidium perfluorohexanesulfonate. These may be used alone or in combination of two or more. The perfluoroalkyl group preferably has 1 to 18 carbon atoms, more preferably 1 to 10 carbon atoms, much more preferably 1 to 8 carbon atoms. Of these, potassium perfluorobutanesulfonate is particularly preferred.

In alkali (earth) metal perfluoroalkyl sulfonate comprising an alkali metal, not a few fluoride ions ($F^-$) are generally mixed. Since the presence of the fluoride ions may cause a deterioration in flame retardancy, they are preferably reduced as much as possible. The content of the fluoride ions can be measured by ion chromatography. The content of the fluoride ions is preferably not higher than 100 ppm, more preferably not higher than 40 ppm, particularly preferably not higher than 10 ppm. Further, it is suitably not lower than 0.2 ppm from the viewpoint of production efficiency. Alkali (earth) metal perfluoroalkyl sulfonate having the content of the fluoride ions reduced can be produced by a known method. In addition, it can be produced by a method of reducing the content of fluoride ions contained in a raw material when a fluorine-containing organometallic salt is produced, a method of removing hydrogen fluoride obtained by a reaction by gas generated during the reaction or heating, or a method of reducing the content of fluoride ions by use of a purification method such as recrystallization or reprecipitation in a step of producing a fluorine-containing organometallic salt. In particular, since the component D is relatively easily soluble in water, it is preferably produced by a step of dissolving it at temperatures higher than room temperature by use of ion exchange water, especially water having an electrical resistance value of not smaller than 18 MΩ·cm, i.e. having an electrical conductivity of not higher than about 0.55 μS/cm, cleaning it and then cooling it to recrystallize it.

Specific examples of alkali (earth) metal aromatic sulfonate include disodium diphenyl sulfide-4,4'-disulfonate, dipotassium diphenyl sulfide-4,4'-disulfonate, potassium 5-sulfoisophthalate, sodium 5-sulfoisophthalate, polyethylene terephthalate polysodium polysulfonate, calcium 1-methoxynaphthalene-4-sulfonate, disodium 4-dodecylphenyl ether disulfonate, polysodium poly(2,6-dimethylphenyleneoxide)polysulfonate, polysodium poly(1,3-phenyleneoxide)polysulfonate, polysodium poly(1,4-phenyleneoxide)polysulfonate, polypotassium poly(2,6-diphenylphenyleneoxide)polysulfonate, lithium poly(2-fluoro-6-butylphenyleneoxide)polysulfonate, potassium sulfonate of benzene sulfonate, sodium benzene sulfonate, strontium benzene sulfonate, magnesium benzene sulfonate, dipotassium p-benzene sulfonate, dipotassium naphthalene-2,6-disulfonate, calcium biphenyl-3,3'-disulfonate, sodium diphenyl sulfone-3-sulfonate, potassium diphenyl sulfone-3-sulfonate, dipotassium diphenyl sulfone-3,3'-disulfonate, dipotassium diphenyl sulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophene sulfonate, potassium diphenyl sulfoxide-4-sulfonate, a formalin condensate of sodium naphthalene sulfonate, and a formalin condensate of sodium anthracene sulfonate. Of these alkali (earth) metal aromatic sulfonates, the potassium salts are particularly preferred. Of these alkali (earth) metal aromatic sulfonates, potassium diphenyl sulfone-3-sulfonate and dipotassium diphenyl sulfone-3,3'-disulfonate are suitable, and a mixture thereof (weight ratio between the former and the latter is 15/85 to 30/70) is particularly suitable.

(Component E)

A fluorine-containing polymer capable of fibril formation (component E) serves as an anti-dripping agent. Illustrative examples of the polymer include polytetrafluoroethylene, a tetrafluoroethylene-based copolymer (e.g. a tetrafluoroethylene/hexafluoropropylene copolymer), a partially fluorinated polymer as described in U.S. Pat. No. 4,379,910, and a polycarbonate resin produced from fluorinated diphenol. Preferred is polytetrafluoroethylene (hereinafter may be abbreviated as "PTFE".)

Polytetrafluoroethylene capable of fibril formation (fibril-forming PTFE) has a very high molecular weight and shows a tendency that it binds to another PTFE by external force such as shear force and becomes fibriform. Its number average molecular weight is 1,500,000 to several tens of millions. Its lower limit is more preferably 3,000,000. The number average molecular weight is calculated based on the melt viscosity of the polytetrafluoroethylene at 380° C., as disclosed in JP-A 6-145520. That is, the fibril-forming PTFE has a melt viscosity at 380° C. measured by a method described in the publication of $10^7$ to $10^{13}$ poise, preferably $10^8$ to $10^{12}$ poise.

The PTFE may be used not only in solid form but also in the form of an aqueous dispersion. Further, the PTFE capable of fibril formation may also be used in the form of a mixture with other resin so as to improve dispersibility in the resin and to obtain better flame retardancy and mechanical properties. In addition, as disclosed in JP-A 6-145520, a structure comprising the fibril-forming PTFE as a core and a low-molecular-weight polytetrafluoroethylene as a shell is also preferably used.

Illustrative examples of commercial products of the fibril-forming PTFE include Teflon (registered trademark) 6J of DU PONT-MITSUI FLUOROCHEMICALS COMPANY, LTD., and POLYFLON MPA FA500, F-201L of DAIKIN CHEMICAL INDUSTRIES, LTD. Representative examples of commercial products of aqueous dispersion of the fibril-forming PTFE include Fluon AD-1, AD-936 of Asahi ICI Fluoropolymers Co., Ltd., Fluon D-1, D-2 of DAIKIN INDUSTRIES, LTD., and Teflon (registered trademark) 30J of DU PONT-MITSUI FLUOROCHEMICALS COMPANY, LTD.

As the fibril-forming PTFE in mixture form, there can be used those obtained by (1) a method of mixing an aqueous dispersion of fibril-forming PTFE with an aqueous dispersion or solution of organic polymer to conduct co-precipitation and obtaining a coaggregated mixture (method described in JP-A 60-258263 and JP-A 63-154744), (2) a method of mixing an aqueous dispersion of fibril-forming PTFE with dried organic polymer particles (method described in JP-A 4-272957), (3) a method of mixing an aqueous dispersion of fibril-forming PTFE with an organic polymer particle solution uniformly and removing the media from the mixture simultaneously (method described in JP-A 6-220210 and JP-A 8-188653), (4) a method of polymerizing a monomer which forms an organic polymer in an aqueous dispersion of fibril-forming PTFE (method described in JP-A 9-95583), and (5) a method of mixing an aqueous dispersion of PTFE with an organic polymer dispersion uniformly, polymerizing a vinyl monomer in the mixed dispersion and obtaining the mixture (method described in JP-A 11-29679). Illustrative examples of commercial products of these fibril-forming PTFEs in mixture form include "METABLEN A3800" (trade name) of Mitsubishi Rayon Co., Ltd., and "BLENDEX B449" (trade name) of GE Specialty Chemical Co., Ltd.

The polycarbonate resin composition is required to have high surface smoothness in some cases. Therefore, the above fibril-forming PTFE is preferably finely dispersed. As means for achieving the fine dispersion, the above fibril-forming PTFEs in mixture form are advantageous. Further, a method of feeding an aqueous dispersion of PTFE into a melt kneader directly is also advantageous for the fine dispersion. However, the aqueous dispersion needs attention in that color slightly deteriorates. The proportion of the fibril-forming PTFE in mixture form is preferably 10 to 80 wt %, more preferably 15 to 75 wt %, out of 100 wt % of the mixture. With the proportion of the fibril-forming PTFE within the above range, good dispersibility of the fibril-forming PTFE can be achieved.

(Amount of Each Component)

The polycarbonate resin composition comprises 60 to 99.9 parts by weight, preferably 70 to 95 parts by weight, more preferably 70 to 90 parts by weight, much more preferably 75 to 85 parts by weight of the component A and 0.1 to 40 parts by weight, preferably 5 to 30 parts by weight, more preferably 10 to 30 parts by weight, much more preferably 15 to 25 parts by weight of the component B, based on 100 parts by weight of the total of the components A and B. The polycarbonate resin composition of the present invention can be produced by adding the component B to the component A in the above proportions. When the amount of the component B is smaller than the above lower limit, a thermal stability improving effect is hardly noticeable and a good light reflecting effect is difficult to attain, while when the amount of the component B is larger than the above upper limit, the thermal stability of the resin composition may be deteriorated, and its physical properties may also be deteriorated.

The amount of the component C is 0.001 to 5 parts by weight, preferably 0.01 to 3 parts by weight, more preferably 0.1 to 1 part by weight, based on 100 parts by weight of the total of the components A and B.

The amount of the component D is preferably 0.0001 to 2 parts by weight, more preferably 0.001 to 0.6 parts by weight, much more preferably 0.005 to 0.2 parts by weight, based on 100 parts by weight of the total of the components A and B. The amount of the component E is 0.05 to 1 part by weight, preferably 0.1 to 0.8 parts by weight, more preferably 0.15 to 0.7 parts by weight, based on 100 parts by weight of the total of the components A and B. The amount of the component E indicates the net amount of PTFE in the case of PTFE in mixture form. With the preferred contents of the components D and E, good flame retardancy and good thermal stability can be achieved simultaneously.

(Mixing)

A method for mixing the components together is not particularly limited. However, a preferred production method for achieving good dispersion of the titanium dioxide pigment is a method of melt-kneading the components by use of a multi-screw extruder such as a twin-screw extruder.

A representative example of the twin-screw extruder is ZSK (product of Werner & Pfleiderer, trade name). Specific examples of similar types include TEX (product of Japan Steel Works, Ltd., trade name), TEM (product of Toshiba Machine Co., Ltd., trade name), KTX (product of Kobe Steel, Ltd., trade name), and melt kneaders such as FCM (product of Farrel, trade name) Ko-Kneader (product of Buss, trade name), and DSM (product of Krauss-Maffei, trade name). Of these, the type typified by ZSK is more preferred. Screws in the ZSK-type twin-screw extruder are a complete engagement type, and the screws comprise various screw segments differing in length and pitch and various kneading disks differing in width (or comparable kneading segments).

A more preferred embodiment of the twin-screw extruder is as follows. As for the shape of the screw, a one-, two- or three-thread screw can be used. Particularly, the two-thread screw whose molten resin transport ability and shearing kneading ability can be widely applied can be preferably used. The ratio of the length (L) to diameter (D) of the screw in the twin-screw extruder is preferably 20 to 45, more preferably 28 to 42. The larger the L/D, the more easily the homogeneous dispersion can be achieved. However, when it is too large, decomposition of the resin is liable to occur due to thermal degradation. The screw must have at least one kneading zone constituted by kneading disk segments (or comparable kneading segments) for improving kneadability and preferably has 1 to 3 kneading zones.

Further, as the extruder, one having a vent which can discharge water in the raw material or volatile gas generated from the melt-kneaded resin can be preferably used. A vacuum pump for discharging the generated water or volatile gas from the vent to the outside of the extruder efficiently is preferably disposed. Further, it is also possible to dispose a screen for removing foreign materials contained in the raw material to be extruded in a zone before the die of the extruder so as to remove foreign materials from the resin composition. Illustrative examples of the screen include a wire mesh, a screen changer, and a sintered metal plate (such as a disk filter).

Further, a method of feeding the component B and other additives (hereinafter simply referred to as "additives") to the extruder is not particularly limited. Representative examples of the method include (i) a method of feeding the additives into the extruder separately from the polycarbonate resin, (ii) a method of premixing the additives and the polycarbonate resin powder by use of a mixer such as a super mixer and then feeding the mixture to the extruder, and (iii) a method of melt-kneading the additives and the polycarbonate resin in advance to form master pellets.

An example of the above method (ii) is a method of premixing all necessary raw materials and feeding the mixture to the extruder. Another example thereof is a method of preparing a master agent containing the additives in high concentration and feeding the master agent to the extruder either independently or after further premixing the agent with the remaining polycarbonate resin. The master agent may be in powder form or in compression-granulated powder form. Further, illustrative examples of other premixing means include a Nauter mixer, a V-shaped blender, a Henschel mixer, a mechanochemical mixer, and an extrusion mixer. A high-speed agitation mixer such as a super mixer is preferred. Still another premixing method is a method of dispersing the polycarbonate resin and the additives in a solvent uniformly to prepare a solution and removing the solvent, for example.

The resin extruded from the extruder is pelletized by direct cutting or by forming a strand and cutting the strand by a pelletizer. Further, when the influence of exterior dust needs to be reduced, the atmosphere around the extruder is preferably cleaned. Further, in production of the pellets, narrowing of shape distribution of the pellets, a reduction in the occurrence of miscut, a reduction in fine powder produced during transportation and a reduction in air bubbles (vacuum bubbles) produced in the strand or pellets can be conducted as appropriate by use of various methods which have already been proposed for polycarbonate resins for optical disks. By achieving these, high cycling of molding and a reduction in the frequency of occurrence of defects such as silver can be achieved.

EMBODIMENTS

Preferred embodiments of the production method of the present invention are as follows.

(1) A method for producing a resin composition which comprises mixing 70 to 90 parts by weight of bisphenol A type polycarbonate resin (component A1) and 10 to 30 parts by weight of titanium dioxide pigment (component B1) with 0.03 to 0.1 parts by weight of alkali (earth) metal sulfonate (component D) and 0.2 to 0.8 parts by weight of fluorine-containing polymer capable of fibril formation (component E) based on 100 parts by weight of the total of the components A1 and B1, the component B
(i) satisfying $0.1 \leq (b)-(a) \leq 0.45$, when weight reduction at 23 to 100° C. by thermogravimetric analysis (TGA) is (a) wt % and weight reduction at 23 to 300° C. by TGA is (b) wt %, and
(ii) satisfying $0.003 \leq (d)/(c) \leq 0.01$ and $0.003 \leq (e)/(c) \leq 0.02$, when weight percentages derived from Ti, Al and Si elements in X-ray fluorescence analysis are (c) wt %, (d) wt % and (e) wt %, respectively.

(2) A method for producing a resin composition which comprises mixing 70 to 90 parts by weight of bisphenol A type polycarbonate resin (component A1) and 10 to 30 parts by weight of titanium dioxide pigment (component B1) with 0.03 to 0.05 parts by weight of alkali (earth) metal sulfonate (component D) and 0.4 to 0.8 parts by weight of fluorine-containing polymer capable of fibril formation (component E) based on 100 parts by weight of the total of the components A1 and B1, the component B
(i) satisfying $0.2 \leq (b)-(a) \leq 0.3$, when weight reduction at 23 to 100° C. by thermogravimetric analysis (TGA) is (a) wt % and weight reduction at 23 to 300° C. by TGA is (b) wt %, and
(ii) satisfying $0.005 \leq (d)/(c) \leq 0.01$ and $0.008 \leq (e)/(c) \leq 0.02$, when weight percentages derived from Ti, Al and Si elements in X-ray fluorescence analysis are (c) wt %, (d) wt % and (e) wt %, respectively.

(3) A method for producing a resin composition which comprises mixing 70 to 90 parts by weight of bisphenol A type polycarbonate resin (component A1) and 10 to 30 parts by weight of titanium dioxide pigment (component B1) with 0.05 to 0.3 parts by weight of acid-modified olefinic wax (component C1) which is a copolymer of maleic anhydride and α-olefin, 0.03 to 0.1 parts by weight of alkali (earth) metal sulfonate (component D) and 0.2 to 0.8 parts by weight of fluorine-containing polymer capable of fibril formation (component E) based on 100 parts by weight of the total of the components A1 and B1, the component B
(i) satisfying $0.14 \leq (b)-(a) \leq 0.45$, when weight reduction at 23 to 100° C. by thermogravimetric analysis (TGA) is (a) wt % and weight reduction at 23 to 300° C. by TGA is (b) wt %, and
(ii) satisfying $0.004 \leq (d)/(c) \leq 0.01$ and $0.003 \leq (e)/(c) \leq 0.015$, when weight percentages derived from Ti, Al and Si elements in X-ray fluorescence analysis are (c) wt %, (d) wt % and (e) wt %, respectively.

(4) A method for producing a resin composition which comprises mixing 70 to 90 parts by weight of bisphenol A type polycarbonate resin (component A1) and 10 to 30 parts by weight of titanium dioxide pigment (component B1) with 0.1 to 0.3 parts by weight of acid-modified olefinic wax (component C1) which is a copolymer of maleic anhydride and α-olefin, 0.03 to 0.05 parts by weight of alkali (earth) metal sulfonate (component D) and 0.4 to 0.8 parts by weight of fluorine-containing polymer capable of fibril formation (component E) based on 100 parts by weight of the total of the components A1 and B1, the component B (i) satisfying $0.26 \leqq (b)-(a) \leqq 0.3$, when weight reduction at 23 to 100° C. by thermogravimetric analysis (TGA) is (a) wt % and weight reduction at 23 to 300° C. by TGA is (b) wt %, and (ii) satisfying $0.006 \leqq (d)/(c) \leqq 0.01$ and $0.008 \leqq (e)/(c) \leqq 0.01$, when weight percentages derived from Ti, Al and Si elements in X-ray fluorescence analysis are (c) wt %, (d) wt % and (e) wt %, respectively.

<Pellets>

The present invention includes pellets which comprise a resin composition comprising 60 to 99.9 parts by weight of polycarbonate resin (component A) and 0.1 to 40 parts by weight of titanium dioxide pigment (component B), the component B in the pellets (i) satisfying $0.05 \leqq (b)-(a) \leqq 0.25$, when weight reduction at 23 to 100° C. by thermogravimetric analysis (TGA) is (a) wt % and weight reduction at 23 to 300° C. by TGA is (b) wt %, and (ii) satisfying $0.001 \leqq (d)/(c) \leqq 0.01$ and $0.001 \leqq (e)/(c) \leqq 0.02$, when weight percentages derived from Ti, Al and Si elements in X-ray fluorescence analysis are (c) wt %, (d) wt % and (e) wt %, respectively.

The pellets comprise 60 to 99.9 parts by weight, preferably 70 to 95 parts by weight, more preferably 70 to 90 parts by weight, much more preferably 75 to 85 parts by weight of the component A and 0.1 to 40 parts by weight, preferably 5 to 30 parts by weight, more preferably 10 to 30 parts by weight, much more preferably 15 to 25 parts by weight of the component B, based on 100 parts by weight of the total of the components A and B.

The conditions (i) and (ii) of the component B in the pellets can be measured by the following method. That is, about 2 g of sample is weighed, dissolved in about 50 mml of methylene chloride and then filtered by filter paper, and the residue is dried. For the content of titanium dioxide obtained by this procedure, the conditions (i) and (ii) are measured by thermogravimetric analysis (TGA) and X-ray fluorescence analysis in the same manner as the content of the above raw material titanium dioxide.

Although the pellets can take a general shape such as a cylindrical, prismatic or spherical shape, the shape of the pellets is more suitably cylindrical. The diameter of the cylinder is preferably 1 to 5 mm, more preferably 1.5 to 4 mm, much more preferably 2 to 3.3 mm. Meanwhile, the length of the cylinder is preferably 1 to 30 mm, more preferably 2 to 5 mm, much more preferably 2.5 to 3.5 mm.

<Molded Articles>

Various molded articles can be produced by injection-molding the pellets. Alternatively, without going through the pellets, the resin melt-kneaded in an extruder can be directly formed into a sheet, a film, a profile extrusion molded article, a direct blow molded article or an injection molded article.

As for the injection molding, not only a general molding method but also such injection molding methods as injection compression molding, injection press molding, gas assist injection molding, foam molding (including one involving infusion of supercritical fluid), insert molding, in-mold coating molding, insulated metal molding, rapid heating-cooling molding, two-color molding, sandwich molding and ultrafast injection molding can be used as appropriate according to purposes to obtain a molded article. The advantages of these various molding methods are already widely known. Further, either of cold runner molding and hot runner molding can be selected.

Further, the resin composition according to the present invention can also be used in the form of various profile extrusion molded articles, a sheet and a film by extrusion. Further, to form the sheet or film, inflation, calendaring, casting or the like can also be used. Further, the resin composition can be molded into a heat shrinkable tube by subjecting the resin composition to a specific stretching operation. Further, it is also possible to form the resin composition according to the present invention into a molded article by rotational molding, blow molding or the like.

Thereby, a molded article of the polycarbonate resin composition having excellent light reflectivity and thermal stability can be provided. That is, according to the present invention, a molded article obtained by melt-molding the polycarbonate resin composition comprising 60 to 99.9 parts by weight of the component A and 0.1 to 40 parts by weight of the component B which add up to 100 parts by weight is provided.

Illustrative examples of the molded article include light reflection materials such as a reflector for a backlight of a liquid crystal display. Illustrative examples of a light source for the backlight include a cold cathode tube and a light emitting diode (LED, especially a white LED). It is suitable for a white LED array in particular.

Further, the molded article formed from the polycarbonate resin composition of the present invention can be subjected to various surface treatments. The surface treatments are treatments for forming a new layer on the surface layer of the resin molded article, such as vapor deposition (e.g. physical vapor deposition, chemical vapor deposition), plating (e.g. electroplating, electroless plating, fusion plating), painting, coating and printing, and general methods used for polycarbonate resins can be used. Specific examples of the surface treatments include various surface treatments such as hard coating, water-shedding/oil-shedding coating, ultraviolet absorbing coating, infrared absorbing coating, and metalizing (e.g. vapor deposition).

As the molded article, a molded article obtained by molding a resin composition comprising 60 to 99.9 parts by weight of polycarbonate resin (component A) and 0.1 to 40 parts by weight of titanium dioxide pigment (component B), the component B (i) satisfying $0.001 \leqq (d)/(c) \leqq 0.01$ and $0.001 \leqq (e)/(c) \leqq 0.02$, when weight percentages derived from Ti, Al and Si elements in X-ray fluorescence analysis are (c) wt %, (d) wt % and (e) wt %, respectively, and having a silver occurrence rate of lower than 10%.

The silver occurrence rate is measured in the following manner. That is, a molded plate (90 mm in length×50 mm in width) having an arithmetic mean roughness (Ra) of 0.03 μm and a thickness of 2 mm is injection-molded, and the presence or absence of silver streaks is observed. Molded plates from immediately after purging to the tenth shot are discarded, and the occurrence of silver streaks is observed on molded plates from the eleventh to twentieth shots.

A silver occurrence rate of lower than 10% intends to exclude a molded article having silver streaks on one or more of 10 molded plates obtained by 10 shots in the above method.

<Method for Preventing Decrease in Molecular Weight of Resin Composition>

The present invention includes a method for preventing a decrease in the molecular weight of a resin composition comprising a polycarbonate resin (component A) and a titanium dioxide pigment (component B), the composition using, as the component B, a titanium dioxide pigment which:

(i) satisfies $0.05 \leqq (b)-(a) \leqq 0.6$, when weight reduction at 23 to 100° C. by thermogravimetric analysis (TGA) is (a) wt % and weight reduction at 23 to 300° C. by TGA is (b) wt %, and (ii) satisfies $0.001 \leqq (d)/(c) \leqq 0.01$ and $0.001 \leqq (e)/(c) \leqq 0.02$, when weight percentages derived from Ti, Al and Si elements in X-ray fluorescence analysis are (c) wt %, (d) wt % and (e) wt %, respectively.

The components A and B are as described in the section of the resin composition. The component B preferably satisfies $0.05 \leqq (b)-(a) \leqq 0.4$. Further, the average particle diameter of the component B is preferably 0.01 to 0.4 µm, more preferably 0.15 to 0.25 µm. The component B is preferably rutile-type crystals produced by a chlorine method. According to the present invention, a decrease in the molecular weight of the resin composition to be obtained which is caused by heating can be prevented by adding the component B which satisfies the conditions (i) and (ii) to the component A.

<Other Components>

The present invention uses the components A and B as essential components and the components C to E as suitable components. In addition to these components, the present invention can use the following components as required.

(i) Phosphorus Stabilizer

The present invention may further contain various phosphorus stabilizers. A primary object of adding the phosphorus stabilizers is to improve the thermal stability during molding of the resin composition and attain good light reflectivity. Illustrative examples of the phosphorus stabilizers include phosphorous acid, phosphoric acid, phosphonous acid, phosphonic acid and their esters, as well as tertiary phosphine.

Specific examples of phosphite, phosphate, phosphonite and phosphonate compounds include compounds described in JP-A 2004-137472.

Illustrative examples of the tertiary phosphine include triethyl phosphine, tripropyl phosphine, tributyl phosphine, trioctyl phosphine, triamyl phosphine, dimethylphenyl phosphine, dibutylphenyl phosphine, diphenylmethyl phosphine, diphenyloctyl phosphine, triphenyl phosphine, tri-p-tolyl phosphine, trinaphthyl phosphine, and diphenyl benzyl phosphine. A particularly preferred tertiary phosphine is triphenyl phosphine.

The above phosphorus stabilizers can be used alone or in admixture of two or more. Of the above phosphorus stabilizers, the phosphite compound or phosphonite compound is preferred. The most preferred phosphite compound is tris(2,4-di-t-butylphenyl)phosphite. As the phosphonite compound, tetrakis(2,4-di-t-butylphenyl)-4,4'-biphenylene diphosphonite and bis(2,4-di-t-butylphenyl)-phenyl-phenyl phosphonite and their mixture are preferred, and their mixture is the most preferred. The weight ratio of the two compounds (former/latter) is preferably 90/10 to 70/30, more preferably 85/15 to 75/25. Further, use of these compounds in combination with the phosphate compound is also a preferred embodiment.

(ii) Hindered Phenol Stabilizer

In the present invention, a hindered phenol stabilizer may be added to the resin composition so as to improve thermal stability at the time of molding, anti-heat aging and resistance to ultraviolet radiation. Illustrative examples of the hindered phenol stabilizer include α-tocopherol, butylhydroxytoluene, sinapyl alcohol, vitamin E, octadecyl-3-(3,5-di-t-butyl-4-hydroxyphenyl)propionate, 2-t-butyl-6-(3'-t-butyl-5'-methyl-2'-hydroxybenzyl)-4-methylphenyl acrylate, 2,6-di-t-butyl-4-(N,N-dimethylaminomethyl)phenol, 3,5-di-t-butyl-4-hydroxybenzyl phosphonate diethyl ester, 2,2'-methylene bis(4-methyl-6-t-butylphenol), 2,2'-methylene bis(4-ethyl-6-t-butylphenol), 4,4'-methylene bis(2,6-di-t-butylphenol), 2,2'-methylene bis(4-methyl-6-t-cyclohexylphenol), 2,2'-dimethylene-bis(6-α-methyl-benzyl-p-cresol), 2,2'-ethylidene-bis(4,6-di-t-butylphenol), 2,2'-butylidene-bis(4-methyl-6-t-butylphenol), 4,4'-butylidene bis(3-methyl-6-t-butylphenol), triethylene glycol-N-bis-3-(3-t-butyl-4-hydroxy-5-methylphenyl)propionate, 1,6-hexanediol bis[3-(3,5-di-t-butyl-4-hydroxyphenyl)propionate], bis[2-t-butyl-4-methyl-6-(3-t-butyl-5-methyl-2-hydroxybenzyl)phenyl] terephthalate, 3,9-bis{2-[3-(3-t-butyl-4-hydroxy-5-methylphenyl)propionyloxy]-1,1,-dimethylethyl}-2,4,8,10-tetraoxaspiro[-5,5]undecane, 4,4'-thiobis(6-t-butyl-m-cresol), 4,4'-thiobis(3-methyl-6-t-butylphenol), 2,2'-thiobis(4-methyl-6-t-butylphenol), bis(3,5-di-t-butyl-4-hydroxybenzyl)sulfide, 4,4'-di-thiobis(2,6-di-t-butylphenol), 4,4'-tri-thiobis(2,6-di-t-butylphenol), 2,2-thiodiethylene bis-[3-(3,5-di-t-butyl-4-hydroxyphenyl)propionate], 2,4-bis(n-octylthio)-6-(4-hydroxy-3,5-di-t-butylanilino)-1,3,5-triazine, N,N'-hexamethylene bis-(3,5-di-t-butyl-4-hydroxyhydrocinnamide), N,N'-bis[3-(3,5-di-t-butyl-4-hydroxyphenyl)propionyl]hydrazine, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tris(3,5-di-t-butyl-4-hydroxyphenyl)isocyanurate, tris(3,5-di-t-butyl-4-hydroxybenzyl)isocyanurate, 1,3,5-tris(4-t-butyl-3-hydroxy-2,6-dimethylbenzyl)isocyanurate, 1,3,5-tris2[3(3,5-di-t-butyl-4-hydroxyphenyl)propionyloxy]ethyl isocyanurate, and tetrakis[methylene-3-(3,5-di-t-butyl-4-hydroxyphenyl)propionate]methane. Of these, octadecyl-3-(3,5-di-t-butyl-4-hydroxyphenyl)propionate (typical commercial product thereof is Irganox 1076 (trade name) of CIBA SPECIALTY CHEMICALS) is preferred. All of the above hindered phenol antioxidants are readily available. These antioxidants can be used alone or in combination of two or more.

The content of the above (i) phosphorus stabilizer and the content of the above (ii) hindered phenol antioxidant are 0.0001 to 1 part by weight, preferably 0.001 to 0.1 parts by weight, more preferably 0.005 to 0.1 parts by weight, based on 100 parts by weight of the total of the components A and B. When the content of the stabilizer is lower than the above range, a good stabilization effect is difficult to obtain, while when the content of the stabilizer is higher than the above range, a deterioration in the physical properties of the composition may occur.

In the present invention, antioxidants other than the above hindered phenol antioxidants may be used to further stabilize the color of a molded article at the time of heat treatment. Illustrative examples of the other antioxidants include lactone stabilizers typified by a reaction product of 3-hydroxy-5,7-di-t-butyl-furan-2-one and o-xylene (details of the stabilizers are described in JP-A 7-233160), and sulfur-containing stabilizers such as pentaerythritol tetrakis(3-mercaptopropionate), pentaerythritol tetrakis(3-laurylthiopropionate) and glycerol-3-stearylthiopropionate. The content of these other antioxidants is preferably 0.001 to 0.05 parts by weight based on 100 parts by weight of the total of the components A and B. Further, the polycarbonate resin composition of the present invention can also contain a hindered amine light stabilizer.

(iii) Flame Retardant

The resin composition may contain various compounds other than alkali (earth) metal sulfonate which are known as flame retardants for polycarbonate resins. In addition to an improvement in flame retardancy, addition of the compounds leads to improvements in, for example, flowability, rigidity and thermal stability, based on the characteristics of the compounds. Illustrative examples of the flame retardants include (i) organic phosphorus flame retardants (such as a monophosphate compound, phosphate oligomer compound, phosphonate oligomer compound, phosphonitrile oligomer compound and phosphonic acid amide compound), (ii) silicone flame retardants comprising silicone compounds, (iii) halogen flame retardants (such as a brominated epoxy resin, brominated polystyrene, brominated polycarbonate (including oligomers), brominated polyacrylate and chlorinated polyethylene), and (iv) organometallic salts other than alkali (earth) metal sulfonate.

(iii-i) Organic Phosphorus Flame Retardants

The resin composition may contain an organic phosphorus flame retardant. As the organic phosphorus flame retardant, an aryl phosphate compound is suitable. This is because the phosphate compound is generally excellent in color and hardly gives an adverse effect on high light reflectivity. Further, the phosphate compound is advantageous in that it can enhance the moldability of the resin composition of the present invention because it has a plasticizing effect. As the phosphate compound, various phosphate compounds which have heretofore been known as flame retardants can be used. More suitably, there can be used, in particular, one or more of phosphate compounds represented by the following general formula (1):

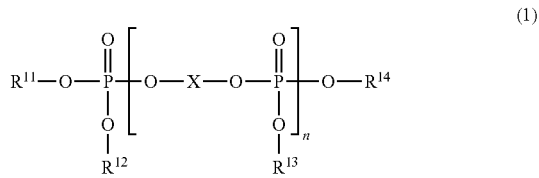

(1)

(wherein X represents a divalent organic group derived from a dihydric phenol, $R^{11}$, $R^{12}$, $R^{13}$ and $R^{14}$ represent a monovalent organic group derived from a monohydric phenol, and n represents an integer of 0 to 5.)

The phosphate compound of the above formula may be a mixture of compounds differing in the value of the n. In the case of the mixture, the average value of the n is preferably 0.5 to 1.5, more preferably 0.8 to 1.2, much more preferably 0.95 to 1.15, particularly preferably 1 to 1.14.

Suitable specific examples of the dihydric phenol from which the above X is derived include hydroquinone, resorcinol, bis(4-hydroxydiphenyl)methane, bisphenol A, dihydroxydiphenyl, dihydroxy naphthalene, bis(4-hydroxyphenyl)sulfone, bis(4-hydroxyphenyl)ketone, and bis(4-hydroxyphenyl)sulfide. Of these, resorcinol, bisphenol A and dihydroxydiphenyl are preferred.

Suitable specific examples of the monohydric phenol from which the above $R^{11}$, $R^{12}$, $R^{13}$ and $R^{14}$ are derived include phenol, cresol, xylenol, isopropylphenol, butylphenol, and p-cumylphenol. Of these, phenol and 2,6-dimethylphenol are preferred.

The monohydric phenol may have a halogen atom substituted. Specific examples of phosphate compounds having groups derived from the monohydric phenol include tris(2,4,6-tribromophenyl)phosphate, tris(2,4-dibromophenyl)phosphate and tris(4-bromophenyl)phosphate.

Meanwhile, suitable specific examples of phosphate compounds having no halogen atoms substituted include monophosphate compounds such as triphenyl phosphate and tri(2,6-xylyl)phosphate, a phosphate oligomer comprising resorcinol bisdi(2,6-xylyl)phosphate as a main constituent, a phosphate oligomer comprising 4,4-dihydroxydiphenylbis (diphenylphosphate) as a main constituent and a phosphate oligomer comprising bisphenol A bis(diphenylphosphate) ("comprising as a main constituent" indicates "may contain a small amount of other component differing in the degree of polymerization", and more suitably indicates that a component wherein n in the above formula (1) is 1 is contained in an amount of not smaller than 80 wt %, more preferably not smaller than 85 wt %, much more preferably not smaller than 90 wt %).

The content of the organic phosphorus flame retardant is preferably 1 to 20 parts by weight, more preferably 2 to 10 parts by weight, much more preferably 2 to 7 parts by weight, based on 100 parts by weight of the total of the components A and B.

(iii-ii) Silicone Flame Retardants

In the present invention, a silicone flame retardant may be used. A silicone compound used as the silicone flame retardant improves flame retardancy by a chemical reaction upon combustion. As the compound, various compounds which have heretofore been proposed as flame retardants for aromatic polycarbonate resins can be used. It is considered that the silicone compound imparts a flame retarding effect to a polycarbonate resin by forming a structure by binding to itself or a component derived from a resin upon its combustion or by a reduction reaction upon formation of the structure. Therefore, the silicone compound preferably contains a group which is highly active in the reaction. More preferably, the silicone compound preferably contains at least one group selected from an alkoxy group and hydrogen (i.e. Si—H group) in a predetermined amount. The content of the group (alkoxy group, Si—H group) is preferably 0.1 to 1.2 mol/100 g, more preferably 0.12 to 1 mol/100 g, much more preferably 0.15 to 0.6 mol/100 g. The content can be determined by measuring the amount of hydrogen or alcohol generated per unit weight of the silicone compound by an alkali decomposition method. As the alkoxy group, an alkoxy group having 1 to 4 carbon atoms is preferred, and a methoxy group in particular is suitable.

In general, the structure of the silicone compound is constituted by combining the following four kinds of siloxane units arbitrarily. That is, M unit: monofunctional siloxane unit such as $(CH_3)_3SiO_{1/2}$, $H(CH_3)_2SiO_{1/2}$, $H_2(CH_3)SiO_{1/2}$, $(CH_3)_2(CH_2=CH)SiO_{1/2}$, $(CH_3)_2(C_6H_5)SiO_{1/2}$ or $(CH_3)(C_6H_5)(CH_2=CH)SiO_{1/2}$, D unit: difunctional siloxane unit such as $(CH_3)_2SiO$, $H(CH_3)SiO$, $H_2SiO$, $H(C_6H_5)SiO$, $(CH_3)(CH_2=CH)SiO$ or $(C_6H_5)_2SiO$, T unit: trifunctional siloxane unit such as $(CH_3)SiO_{3/2}$, $(C_3H_7)SiO_{3/2}$, $HSiO_{3/2}$, $(CH_2=CH)SiO_{3/2}$ or $(C_6H_5)SiO_{3/2}$, Q unit: tetrafunctional siloxane unit represented by $SiO_2$.

Specific examples of the structure of the silicone compound used as the silicone flame retardant include $D_n$, $T_p$, $M_mD_n$, $M_mT_p$, $M_mQ_q$, $M_mD_nT_p$, $M_mD_nQ_q$, $M_mT_pQ_q$, $M_mD_nT_pQ_q$, $D_nT_p$, $D_nQ_q$ and $D_nT_pQ_q$. Of these, preferred structures of the silicone compound are $M_mD_n$, $M_mT_p$, $M_mD_nT_p$ and $M_mD_nQ_q$, and a more preferred structure thereof is $M_mD_n$ or $M_mD_nT_p$.

The coefficients m, n, p and q in the above rational formulas are an integer of 1 or larger which represents the degree of polymerization of each siloxane unit, and the total of the coefficients in each rational formula is the average degree of polymerization of the silicone compound. This average degree of polymerization is preferably 3 to 150, more preferably 3 to 80, much more preferably 3 to 60, particularly preferably 4 to 40. The preferable range the average degree of polymerization falls in, the better the flame retardancy of the silicone compound becomes. Further, as will be described later, a silicone compound containing an aromatic group in a given amount is excellent in transparency and color as well. As a result, good reflected light is obtained.

Further, when any of m, n, p and q is a numerical value of 2 or larger, the siloxane unit with the coefficient can be two or more siloxane units differing in hydrogen atoms or organic residues to be bonded.

The silicone compound may be linear or have a branched structure. Further, an organic residue which bonds to the silicon atom preferably has 1 to 30 carbon atoms, more preferably 1 to 20 carbon atoms. Specific examples of the organic residue include an alkyl group such as a methyl, ethyl, propyl, butyl, hexyl or decyl group, a cycloalkyl group such as a cyclohexyl group, an aryl group such as a phenyl group, and an aralkyl group such as a tolyl group. More preferred is an alkyl group having 1 to 8 carbon atoms, an alkenyl group or an aryl group. As the alkyl group, an alkyl group having 1 to 4 carbon atoms such as a methyl, ethyl or propyl group in particular is preferred.

Further, the silicone compound used as the silicone flame retardant preferably contains an aryl group. Meanwhile, a silane compound and a siloxane compound as organic surface treatment agents for titanium dioxide pigments are clearly differentiated from the silicone flame retardant in their suitable embodiment in that the compounds exert a preferred effect when containing no aryl group. A more suitable silicone flame retardant is a silicone compound in which the content of an aromatic group represented by the following general formula (2):

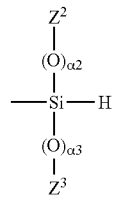

(2)

(wherein X each independently represents an OH group or a monovalent organic residue having 1 to 20 carbon atoms, n represents an integer of 0 to 5, and when n is 2 or larger, Xs can be different groups), is 10 to 70 wt % (more suitably 15 to 60 wt %).

The silicone compound used as the silicone flame retardant may contain a reactive group in addition to the above Si—H group and alkoxy group. Illustrative examples of the reactive group include an amino group, carboxyl group, epoxy group, vinyl group, mercapto group and methacryloxy group.

Suitable examples of the silicone compound having the Si—H group include silicone compounds containing at least one of constitutional units represented by the following general formulas (3) and (4):

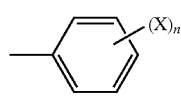

(3)

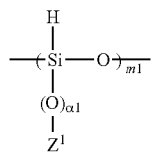

(4)

(wherein $Z^1$ to $Z^3$ each independently represent a hydrogen atom, a monovalent organic residue having 1 to 20 carbon atoms or a compound represented by the following general formula (5), $\alpha 1$ to $\alpha 3$ each independently represent 0 or 1, m1 represents 0 or an integer of 1 or larger, and when m1 is 2 or larger, the recurring units may be different from each other),

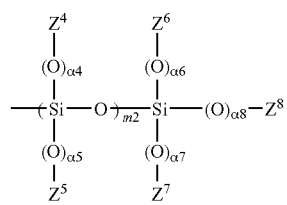

(5)

(wherein $Z^4$ to $Z^8$ each independently represent a hydrogen atom or a monovalent organic residue having 1 to 20 carbon atoms, $\alpha 4$ to $\alpha 8$ each independently represent 0 or 1, m2 represents 0 or an integer of 1 or larger, and when m2 is 2 or larger, the recurring units may be different from each other.)

Of silicone compounds used as the silicone flame retardants, a silicone compound having an alkoxy group is exemplified by at least one compound selected from compounds represented by general formulas (6) and (7):

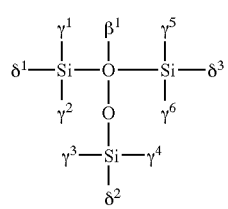

(6)

(wherein $\beta^1$ represents a vinyl group, an alkyl group having 1 to 6 carbon atoms, a cycloalkyl group having 3 to 6 carbon atoms or an aryl or aralkyl group having 6 to 12 carbon atoms, $\gamma^1, \gamma^2, \gamma^3, \gamma^4, \gamma^5$ and $\gamma^6$ represent an alkyl or cycloalkyl group having 1 to 6 carbon atoms or an aryl or aralkyl group having 6 to 12 carbon atoms, at least one of $\gamma^1, \gamma^2, \gamma^3, \gamma^4, \gamma^5$ and $\gamma^6$ is the aryl or aralkyl group, and $\delta^1, \delta^2$ and $\delta^3$ represent an alkoxy group having 1 to 4 carbon atoms),

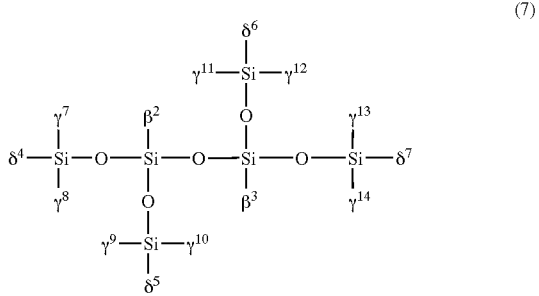

(7)

(wherein β² and β³ represent a vinyl group, an alkyl group having 1 to 6 carbon atoms, a cycloalkyl group having 3 to 6 carbon atoms or an aryl or aralkyl group having 6 to 12 carbon atoms, $\gamma^7$, $\gamma^8$, $\gamma^9$, $\gamma^{10}$, $\gamma^{11}$, $\gamma^{12}$, $\gamma^{13}$ and $\gamma^{14}$ represent an alkyl group having 1 to 6 carbon atoms, a cycloalkyl group having 3 to 6 carbon atoms or an aryl or aralkyl group having 6 to 12 carbon atoms, at least one of $\gamma^7$, $\gamma^8$, $\gamma^9$, $\gamma^{10}$, $\gamma^{11}$, $\gamma^{12}$, $\gamma^{13}$ and $\gamma^{14}$ is the aryl or aralkyl group, and $\delta^4$, $\delta^5$, $\delta^6$ and $\delta^7$ represent an alkoxy group having 1 to 4 carbon atoms).

The content of the silicone flame retardant is preferably 0.1 to 10 parts by weight, more preferably 0.5 to 7 parts by weight, much more preferably 1 to 5 parts by weight, based on 100 parts by weight of the total of the components A and B.

(iii-iii) Halogen Flame Retardants

In the present invention, a halogen flame retardant may be used. As the halogen flame retardant, a brominated polycarbonate (including oligomers) is particularly suitable. A light reflection material is often exposed to high temperatures caused by a light source. Accordingly, a brominated polycarbonate having excellent heat resistance is required in some cases. A brominated polycarbonate used in the present invention comprises a constitutional unit represented by the following general formula (8) as at least 60 mol %, preferably at least 80 mol % of all constitutional units and is particularly preferably a brominated polycarbonate compound which substantially comprises the constitutional unit represented by the following general formula (8):

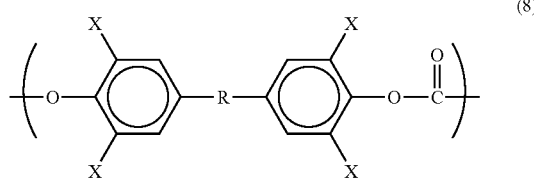

(8)

(wherein X represents a bromine atom, and R represents an alkylene group having 1 to 4 carbon atoms, an alkylidene group having 1 to 4 carbon atoms or —SO₂—.)

Further, in the formula (8), R suitably represents a methylene group, an ethylene group, an isopropylidene group or —SO₂— and particularly preferably represents an isopropylidene group.

The brominated polycarbonate preferably has a small amount of residual chloroformate group terminals and has a terminal chlorine content of preferably not higher than 0.3 ppm, more preferably not higher than 0.2 ppm. The terminal chlorine content can be determined by dissolving a sample in methylene chloride, adding 4-(p-nitrobenzyl)pyridine to react with terminal chlorine (terminal chloroformate) and measuring this by an ultraviolet-visible spectrophotometer (U-3200 of Hitachi, Ltd.). When the terminal chlorine content is 0.3 ppm or lower, the aromatic polycarbonate resin composition has better thermal stability, and the resin composition having excellent light reflectivity and moldability is provided.

Further, the brominated polycarbonate preferably has a small amount of residual hydroxyl group terminals. More specifically, the terminal hydroxyl group content is preferably not higher than 0.0005 mol, more preferably not higher than 0.0003 mol, per mol of the constitutional units of the brominated polycarbonate. The terminal hydroxyl group content can be determined by dissolving a sample in deuterated chloroform and measuring this by a ¹H-NMR method. When the terminal hydroxyl group content is in the above range, the thermal stability of the resin composition is further improved advantageously.

The specific viscosity of the brominated polycarbonate is preferably 0.015 to 0.1 parts by weight, more preferably 0.015 to 0.08. The specific viscosity of the brominated polycarbonate is calculated in accordance with the above specific viscosity calculating formula used to calculate the viscosity average molecular weight of the aromatic polycarbonate resin which is the component A of the present invention.

When the halogen flame retardant is contained, its content is preferably 0.1 to 20 parts by weight, more preferably 0.5 to 10 parts by weight, much more preferably 1 to 7 parts by weight, based on 100 parts by weight of the total of the components A and B.

(iii-iv) Organometallic Salts Other than Alkali (Earth) Metal Sulfonate

In the present invention, organometallic salts other than alkali (earth) metal sulfonate may be used. Suitable examples of the organometallic salts include alkali (earth) metal salts of sulfuric ester and alkali (earth) metal salts of aromatic sulfonamide. Illustrative examples of the alkali (earth) metal salts of sulfuric ester include alkali (earth) metal salts of sulfuric ester of monohydric and/or polyhydric alcohols, in particular. Specific examples of the sulfuric ester of monohydric and/or polyhydric alcohols include methyl sulfate, ethyl sulfate, lauryl sulfate, hexadecyl sulfate, sulfuric ester of polyoxyethylene alkylphenyl ether, sulfuric monoester, diester, triester and tetraester of pentaerythritol, sulfuric ester of monoglyceride laurate, sulfuric ester of monoglyceride palmitate, and sulfuric ester of monoglyceride stearate. Preferred examples of these alkali (earth) metal salts of sulfuric ester include alkali (earth) metal salts of lauryl sulfate.

Illustrative examples of the alkali (earth) metal salts of aromatic sulfonamide include alkali (earth) metal salts of saccharine, N-(p-tolylsulfonyl)-p-toluenesulfoimide, N—(N'-benzylaminocarbonyl)sulfanilimide and N-(phenylcarboxyl)sulfanilimide.

The content of the organometallic salt other than alkali (earth) metal sulfonate is preferably 0.001 to 1 part by weight, more preferably 0.005 to 0.5 parts by weight, much more preferably 0.01 to 0.1 parts by weight, based on 100 parts by weight of the total of the components A and B.

(iv) Fluorescent Brightener

In the present invention, a fluorescent brightener may be used. Use of the fluorescent brightener increases the amount of reflected light. As the fluorescent brightener, known bis-benzoxazole, coumarin and bis(styryl)biphenyl can be used. Of these, a coumarin-based fluorescent brightener is preferred. Illustrative examples of the coumarin-based fluorescent brightener include triazine-phenyl coumarin, benzotriazole-phenyl coumarin, and naphthotriazole-phenyl coumarin. For example, a fluorescent brightener represented by the following formula (9):

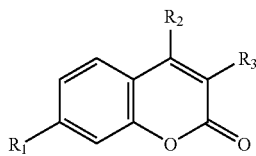

(9)

(wherein $R_1$ represents an amino group, an alkyl-group-substituted amino group, a hydroxyl group, or any of the following formulas (9-i), (9-ii) and (9-iii), $R_2$ represents a hydrogen atom or a fluoroalkyl group, and $R_3$ represents a hydrogen atom, an alkyl group or an aryl group) is preferred.

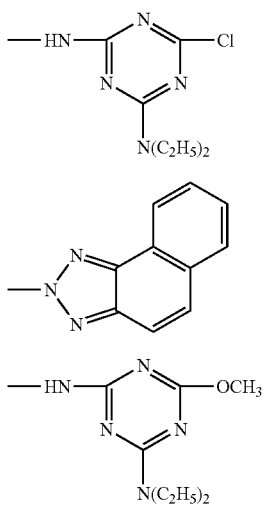

The content of the fluorescent brightener is preferably 0.0001 to 1 part by weight, more preferably 0.0005 to 0.5 parts by weight, much more preferably 0.001 to 0.1 parts by weight, based on 100 parts by weight of the total of the components A and B. With the content of the fluorescent brightener within the above range, better light reflectivity is achieved.

(v) Release Agent

In the present invention, a release agent may be used. Illustrative examples of the release agent include a saturated fatty acid ester, unsaturated fatty acid ester, polyolefin wax (e.g. polyethylene wax, 1-alkene polymer), silicone compound, fluorine compound (e.g. fluorine oil typified by polyfluoroalkyl ether), paraffin wax, and beeswax. The release agent is contained in an amount of preferably 0.005 to 2 parts by weight, more preferably 0.01 to 0.8 parts by weight, based on 100 parts by weight of the total of the components A and B.

Of the release agents, the saturated fatty acid ester, especially a partial ester and/or full ester of higher fatty acid and polyhydric alcohol, is preferred. Particularly, the full ester is suitable. The higher fatty acid refers to an aliphatic carboxylic acid having 10 to 32 carbon atoms. Specific examples thereof include saturated aliphatic carboxylic acids such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, icosanoic acid, docosanoic acid and hexacosanoic acid, and unsaturated aliphatic carboxylic acids such as palmitoleic acid, oleic acid, linoleic acid, linolenic acid, eicosenoic acid, eicosapentaenoic acid and cetoleic acid. Of these, an aliphatic carboxylic acid having 10 to 22 carbon atoms is preferred, and an aliphatic carboxylic acid having 14 to 20 carbon atoms is more preferred. In particular, a saturated aliphatic carboxylic acid having 14 to 20 carbon atoms, especially stearic acid and palmitic acid are preferred. An aliphatic carboxylic acid such as stearic acid is often a mixture comprising other carboxylic acid components differing in the number of carbon atoms. As the above saturated fatty acid ester, an ester compound obtained from stearic acid or palmitic acid which is produced from natural fats and oils and takes a form of a mixture comprising other carboxylic acid components is preferably used.

Meanwhile, as the polyhydric alcohol which is a constituent of the saturated fatty acid ester, a polyhydric alcohol having 3 to 32 carbon atoms is more preferred. Specific examples of the polyhydric alcohol include glycerin, diglycerin, polyglycerin (e.g. decaglycerin), pentaerythritol, dipentaerythritol, diethylene glycol, and propylene glycol.

The acid value of the saturated fatty acid ester in the present invention is preferably 20 or less (can virtually take 0), and its hydroxyl value is preferably 20 to 500 (more preferably 50 to 400). Further, its iodine value is preferably 10 or less (can virtually take 0). These properties can be determined by methods provided in JIS K 0070.

The content of the release agent is 0.005 to 2 parts by weight, preferably 0.01 to 1 part by weight, more preferably 0.05 to 0.5 parts by weight, based on 100 parts by weight of the total of the components A and B.

(vi) Reinforcing Filler

In the present invention, a reinforcing filler may be used. Illustrative examples of the reinforcing filler include various known fillers. However, in the present invention, since the resin composition is required to have light reflectivity, the content of the reinforcing filler is preferably as low as possible and is more preferably 0. When it is necessary to add the reinforcing filler, the reinforcing filler is preferably a silicate mineral filler or glass filler having a high whiteness degree. Suitable examples of the silicate mineral filler include talc, muscovite mica, synthetic fluorine mica, smectite, and wollastonite. Illustrative examples of the glass filler include glass fibers, glass flakes, and glass milled fibers. Silicate mineral fillers and glass fillers coated with a metal oxide such as titanium oxide, zinc oxide, cerium oxide or silicon oxide can also be used.

The above reinforcing fillers may be surface-treated in advance with various surface treatment agents. The reinforcing fillers may be surface-treated with various surface treatment agents such as a silane coupling agent (including alkyl alkoxysilane and polyorgano hydrogen siloxane), higher fatty acid ester, acid compound (e.g. phosphorous acid, phosphoric acid, carboxylic acid and carboxylic anhydride) and wax. Further, the reinforcing fillers may be granulated with a sizing agent such as various resins, higher fatty acid ester and wax.

The reinforcing filler may be contained in an amount of up to 100 parts by weight based on 100 parts by weight of the total of the components A and B. The upper limit of the content of the reinforcing filler is preferably 25 parts by weight, more preferably 20 parts by weight. When the content of the reinforcing filler is too high, color deteriorates and light reflectivity is liable to degrade. Further, loss of surface smoothness is also undesirable as a light reflecting material.

(vii) Antistatic Agent

In the present invention, an antistatic agent may be used. Illustrative examples of the antistatic agent include (1) phosphonium arylsulfonate typified by phosphonium dodecylbenzene sulfonate, phosphonium organic sulfonate such as phosphonium alkylsulfonate, and phosphonium borate such as phosphonium tetrafluoroborate. The content of the phosphonium salt is suitably not larger than 5 parts by weight, preferably 0.05 to 5 parts by weight, more preferably 1 to 3.5 parts by weight, much more preferably 1.5 to 3 parts by weight, based on 100 parts by weight of the total of the components A and B.

Illustrative examples of the antistatic agent include (2) alkali (earth) metal organic sulfonate such as lithium organic sulfonate, sodium organic sulfonate, potassium organic sulfonate, cesium organic sulfonate, rubidium organic sulfonate, calcium organic sulfonate, magnesium organic sulfonate and barium organic sulfonate. As described above, the metal salt is also used as a flame retardant. Specific examples of the metal salt include a metal salt of dodecylbenzene sulfonic acid and a metal salt of perfluoroalkane sulfonic acid. The content of the alkali (earth) metal organic sulfonate as an antistatic agent is suitably not larger than 0.5 parts by weight, preferably 0.001 to 0.3 parts by weight, more preferably 0.005 to 0.2 parts by weight, based on 100 parts by weight of the total of the components A and B. Particularly, alkali metal salts of potassium, cesium and rubidium are suitable.

Illustrative examples of the antistatic agent include (3) ammonium organic sulfonate such as ammonium alkylsulfonate and ammonium arylsulfonate. The content of the ammonium salt is suitably not larger than 0.05 parts by weight based on 100 parts by weight of the total of the components A and B. Illustrative examples of the antistatic agent include (4) a polymer containing a poly(oxyalkylene)glycol component such as polyether ester amide as a constituent thereof. The content of the polymer is suitably not larger than 5 parts by weight based on 100 parts by weight of the total of the components A and B.

(viii) Other Additives

The polycarbonate resin composition of the present invention may contain thermoplastic resins other than the component A, rubbery polymers, a light diffusing agent, dyes and pigments other than the above fluorescent brighteners, a flow modifier, an antibacterial agent, a dispersant such as liquid paraffin, a photocatalytic antifouling agent, a heat-ray absorbent and a photochromic agent.

Illustrative examples of the thermoplastic resins other than the component A include styrene resins (e.g. an acrylonitrile-styrene copolymer resin (AS resin), acrylonitrile-butadiene-styrene copolymer resin (ABS resin) and polystyrene resin), aromatic polyester resins (e.g. a polyethylene terephthalate resin (PET resin), polybutylene terephthalate resin (PBT resin), cyclohexane dimethanol copolyethylene terephthalate resin (so-called PET-G resin), polyethylene naphthalate resin and polybutylene naphthalate resin), polymethyl methacrylate resins (PMMA resins), cyclic polyolefin resins, polylactide resins, polycaprolactone resins, thermoplastic fluorine resins (typified by polyvinylidene fluoride resins, for example), and polyolefin resins (e.g. a polyethylene resin, ethylene-(α-olefin) copolymer resin, polypropylene resin and propylene-(α-olefin) copolymer resin). Illustrative examples of the rubbery polymers include various core-shell graft copolymers and thermoplastic elastomers. The content of the above thermoplastic resin and rubbery polymer is preferably not larger than 20 parts by weight, more preferably not larger than 10 parts by weight, based on 100 parts by weight of the total of the components A and B. Meanwhile, when the thermoplastic resin and rubbery polymer are added, the amount thereof is preferably not smaller than 0.05 parts by weight based on 100 parts by weight of the total of the components A and B.

Illustrative examples of the light diffusing agent include fine polymer particles (suitably, acryl cross-linked particles and silicone cross-linked particles with a diameter of several micrometers), low-refractive-index inorganic fine particles other than the above reinforcing fillers, and their composites. The content of the light diffusing agent is preferably not larger than 20 parts by weight, more preferably not larger than 10 parts by weight, based on 100 parts by weight of the total of the components A and B. Meanwhile, when the light diffusing agent is added, the amount thereof is preferably not smaller than 0.005 parts by weight based on 100 parts by weight of the total of the components A and B.

As the dyes and pigments other than the fluorescent brighteners, a so-called bluing agent is more suitably added. In addition, various dyes and pigments can be used according to the color of reflected light when adjustment of the color is necessary. When the dye and pigment are used, its content is preferably 0.00001 to 0.1 parts by weight, more preferably 0.00005 to 0.05 parts by weight, based on 100 parts by weight of the total of the components A and B.

EXAMPLES

Hereinafter, the present invention will be further described with reference to Examples.

In Examples and Comparative Examples, evaluations were made in the following manners. However, in Examples 16 to 19, measurement of decreased molecular weight ($\Delta Mv$) was conducted by retaining a molten resin in a cylinder for 10 minutes at a cylinder temperature of 280° C. and a mold temperature of 70° C.

(1) Light Reflectivity: An injection-molded plate (90 mm in length×50 mm in width) having an arithmetic mean roughness (Ra) of 0.03 μm and a thickness of 2 mm was measured by a color computer (TC-1800 MK-II of Tokyo Denshoku CO., LTD.). It was evaluated by the lowest reflectivity value at wavelengths of 450 to 850 nm.

(2) Thermal Stability:

(i) Measurement of Decreased Molecular Weight ($\Delta Mv$)

After obtained pellets were dried by a hot air dryer at 120° C. for 6 hours, molded articles including tensile test pieces were prepared by use of an injection molding machine (SG-150U of Sumitomo Heavy Industries, Ltd.) at a cylinder temperature of 270° C. and a mold temperature of 70° C. After the molded articles were molded 20 shots in a row, an injection cylinder was withdrawn with measurement completed, and the molten resin was retained in the cylinder for 5 minutes. After the retention, 4 shots of molding were made under the same conditions. By the molding, molded articles of the resin composition retained in the cylinder were prepared. Of these, the molded article of the second shot was measured for a viscosity average molecular weight by the method described in the present specification. Meanwhile, the viscosity average molecular weight of the molded article of the twentieth shot before the retention was also measured. The value obtained by subtracting the molecular weight after the retention from the molecular weight before the retention was evaluated as $\Delta Mv$. It can be said that the smaller the $\Delta Mv$, the better the thermal stability is.

(ii) Evaluation of Appearance:

Molded plates (90 mm in length×50 mm in width) having an arithmetic mean roughness (Ra) of 0.03 μm and a thickness of 2 mm were injection-molded, and the color thereof and the presence or absence of silver streaks thereon were observed. The molded plates from immediately after purging to the tenth shot were discarded, the molded plate of the eleventh shot was used for evaluation of color, and the molded plates from the twelfth to twentieth shots were used for evaluation of silver streaks.

As for the color, an L value in a portion of the molded plate having an arithmetic mean roughness (Ra) of 0.03 μm and a thickness of 2 mm was measured by use of a color computer (TC-1800 MK-II of Tokyo Denshoku CO., LTD.). Since brightness becomes higher as the L value becomes larger, the molded article shows more intense whiteness in visual observation. Therefore, in the evaluation, the larger the L value becomes, the more preferable it is. Further, those with silver streaks in all of the molded plates were evaluated as x, those with silver streaks in at least one of the molded plates were evaluated as Δ, and those with silver streaks in none of the molded plates were evaluated as ○.

Examples 1 to 13 and Comparative Examples 1 to 6

To polycarbonate resin powder produced from bisphenol A and phosgene by interfacial condensation polymerization, various additives shown in Tables 2 to 4 were added in respective amounts, and they were blended by a blender and melt-kneaded by use of a vented twin-screw extruder (TEX30α (complete engagement, spinning in the same direction, two-thread screws) of Japan Steel Works, Ltd.) to obtain pellets. As for additives other than titanium dioxide pigments, pre-mixtures of the additives in concentrations which were 10 times their respective amounts and the polycarbonate resin powder were prepared by use of a Henschel mixer, and all the materials were then mixed together by a blender. Extrusion conditions comprised a discharge rate of 20 kg/h, a screw rotation speed of 150 rpm, and a vacuum degree of the vent of 3 kPa. Further, the extrusion temperature was 260° C. from the first supply port to the die.

After the obtained pellets were dried by a hot air circulation type dryer at 120° C. for 6 hours, test pieces in the form of smooth and flat plates which had a length of 90 mm, a width of 50 mm, a thickness of 2 mm and an arithmetic mean surface roughness (Ra) of 0.03 μm were molded by use of an injection molding machine (SG-150U of Sumitomo Heavy Industries, Ltd.) at a cylinder temperature of 270° C., a mold temperature of 70° C. and an injection rate of 50 mm/sec. The results of evaluations of the obtained molded plates are shown in Tables 2 to 4.

Descriptions of components shown in Tables 1 to 4 are as follows.
(Component A)
A-1: linear aromatic polycarbonate resin powder synthesized from bisphenol A, p-t-butylphenol as a terminal blocking agent and phosgene by interfacial polycondensation (Panlite L-1225WX (trade name) of Teijin Chemicals Ltd., viscosity average molecular weight: 19,700)
A-2: linear aromatic polycarbonate resin powder synthesized from bisphenol A, p-t-butylphenol as a terminal blocking agent and phosgene by interfacial polycondensation (CM-1000 (trade name) of Teijin Chemicals Ltd., viscosity average molecular weight: 16,000)
(Component B)
B-1: titanium dioxide (WHITE DCF-T-17007 of RESINO COLOR INDUSTRY CO., LTD., the titanium dioxide is rutile-type crystals produced by a chlorine method and is a titanium dioxide pigment which satisfies (b)−(a)=0.28 when weight reduction at 23 to 100° C. by thermogravimetric analysis (TGA) is (a) wt % and weight reduction at 23 to 300° C. by TGA is (b) wt % and which has a ratio of the weight percentage of Al element to the weight percentage of Ti element in X-ray fluorescence analysis of 0.008 and a ratio of the weight percentage of Si element to the weight percentage of Ti element in X-ray fluorescence analysis of 0.009.)

Calculation of the weight percentage of each element in X-ray fluorescence analysis was made by use of MESA-500 of HORIBA Ltd. in accordance with a basic parameter method. The calculation method also applies to other titanium dioxide pigments.

B-2: titanium dioxide (the titanium dioxide is a titanium dioxide pigment using the same $TiO_2$ raw material and surface treatment agent as those used in TIPAQUE PC-3 (trade name) of ISHIHARA SANGYO KAISHA, LTD., the amount of the surface treatment agent being adjusted such that the pigment satisfies (b)−(a)=0.24 when weight reduction at 23 to 100° C. by thermogravimetric analysis (TGA) is (a) wt % and weight reduction at 23 to 300° C. by TGA is (b) wt % and has a ratio of the weight percentage of Al element to the weight percentage of Ti element in X-ray fluorescence analysis of 0.006 and a ratio of the weight percentage of Si element to the weight percentage of Ti element in X-ray fluorescence analysis of 0.019.)

(For Comparisons of the Component B)
B-3: titanium dioxide (TIPAQUE PC-3 (trade name) of ISHIHARA SANGYO KAISHA, LTD., the titanium dioxide is rutile-type crystals produced by a chlorine method and is a titanium dioxide pigment which satisfies (b)−(a)=0.57 when weight reduction at 23 to 100° C. by thermogravimetric analysis (TGA) is (a) wt % and weight reduction at 23 to 300° C. by TGA is (b) wt % and which has a ratio of the weight percentage of Al element to the weight percentage of Ti element in X-ray fluorescence analysis of 0.014 and a ratio of the weight percentage of Si element to the weight percentage of Ti element in X-ray fluorescence analysis of 0.018.)

B-4: titanium dioxide (the titanium dioxide is a titanium dioxide pigment using the same $TiO_2$ raw material and surface treatment agent as those used in TIPAQUE PC-3 (trade name) of ISHIHARA SANGYO KAISHA, LTD., the amount of the surface treatment agent being adjusted such that the pigment satisfies (b)−(a)=0.50 when weight reduction at 23 to 100° C. by thermogravimetric analysis (TGA) is (a) wt % and weight reduction at 23 to 300° C. by TGA is (b) wt % and has a ratio of the weight percentage of Al element to the weight percentage of Ti element in X-ray fluorescence analysis of 0.006 and a ratio of the weight percentage of Si element to the weight percentage of Ti element in X-ray fluorescence analysis of 0.023.)

B-5: titanium dioxide (the titanium dioxide is a titanium dioxide pigment using the same $TiO_2$ raw material and surface treatment agent as those used in DCF-T-17007 of RESINO COLOR INDUSTRY CO., LTD., the amount of the surface treatment agent being adjusted such that the pigment satisfies (b)−(a)=1.38 when weight reduction at 23 to 100° C. by thermogravimetric analysis (TGA) is (a) wt % and weight reduction at 23 to 300° C. by TGA is (b) wt % and has a ratio of the weight percentage of Al element to the weight percentage of Ti element in X-ray fluorescence analysis of 0.005 and a ratio of the weight percentage of Si element to the weight percentage of Ti element in X-ray fluorescence analysis of 0.008.)

The characteristics of the components B-1 to B-5 are shown in Table 1.

Reference Examples

After the above titanium dioxides B-1 to B-5 were heat-treated at 260° C. for 1 minute, (b)−(a) when weight reduction at 23 to 100° C. by thermogravimetric analysis (TGA) is (a) wt % and weight reduction at 23 to 300° C. by TGA is (b) wt % was measured for each of the titanium dioxides B-1 to B-5. The results are shown in Table 1.

TABLE 1

|     | (b) − (a) | (d)/(c) {Al/Ti} | (e)/(c) {Si/Ti} | (b) − (a) (After Heat Treatment) |
|-----|-----------|-----------------|-----------------|----------------------------------|
| B-1 | 0.28      | 0.008           | 0.009           | 0.15                             |
| B-2 | 0.24      | 0.006           | 0.019           | 0.13                             |
| B-3 | 0.57      | 0.014           | 0.018           | 0.28                             |
| B-4 | 0.50      | 0.006           | 0.023           | 0.25                             |
| B-5 | 1.38      | 0.005           | 0.008           | 0.67                             |

(Component C)
C-1: acid-modified olefinic wax which is a copolymer of maleic anhydride and α-olefin (Diacarna PA30M of Mitsubishi Chemical Corporation)

TABLE 1-continued (Component D)
D-1: potassium perfluorobutane sulfonate (MEGAFACE F-114P of Dainippon Ink And Chemicals, Incorporated)
(Component E)
E-1: polytetrafluoroethylene capable of fibril formation (POLYFLON MPA FA500 of DAIKIN INDUSTRIES, LTD.)
E-2: mixture of polytetrafluoroethylene particles capable of fibril formation and styrene-acrylonitrile copolymer particles (polytetrafluoroethylene content: 50 wt %) (BLENDEX449 of GE Specialty Chemical Co., Ltd.)
(Others)
HP: hindered phenol antioxidant (Irganox 1076 of CIBA SPECIALTY CHEMICALS)
VP: full ester comprising pentaerythritol and an aliphatic carboxylic acid and having a molecular weight of 1,061 (ROXIOL VPG-861 of Cognis Japan)
CE: cyclic imino ester ultraviolet absorber (CEi-P of TAKEMOTO OIL & FAT CO., Ltd.)
PSR: coumarin fluorescent brightener (HAKKOL PSR-B (trade name) of HAKKOL CHEMICAL CO., LTD.)

TABLE 2

| Items | | Unit | Ex. 1 | Ex. 2 | Ex. 3 | Ex. 4 | Ex. 5 | Ex. 6 | C. Ex. 1 |
|---|---|---|---|---|---|---|---|---|---|
| Component A | A-1 | Parts by Weight | 90 | 90 | 90 | 90 |  | 90 | 90 |
|  | A-2 | Parts by Weight |  |  |  |  | 90 |  |  |
| Component B | B-1 | Parts by Weight | 10 | 10 | 10 | 10 | 10 |  |  |
|  | B-2 | Parts by Weight |  |  |  |  |  | 10 |  |
|  | B-3 | Parts by Weight |  |  |  |  |  |  | 10 |
| Total of the Above Components |  | Parts by Weight | 100 | 100 | 100 | 100 | 100 | 100 | 100 |
| Component D | D-1 | Parts by Weight |  | 0.03 | 0.05 | 0.03 | 0.03 | 0.03 | 0.03 |
| Component E | E-1 | Parts by Weight |  | 0.4 | 0.4 | 0.4 | 0.4 | 0.4 | 0.4 |
| Others | HP | Parts by Weight | 0.05 | 0.05 | 0.05 | 0.05 | 0.05 | 0.05 | 0.05 |
|  | VP | Parts by Weight | 0.3 | 0.3 | 0.3 | 0.3 | 0.3 | 0.3 | 0.3 |
|  | CE | Parts by Weight |  |  |  | 0.15 |  |  |  |
|  | PSR | Parts by Weight | 0.03 | 0.03 | 0.03 | 0.03 | 0.03 | 0.03 | 0.03 |
| Properties | Reflectivity | % | 95 | 94 | 94 | 94 | 94 | 94 | 94 |
|  | Thermal Stability | ΔMv | — | 100 | 300 | 400 | 400 | 300 | 400 |
|  | Evaluation of | L Value | — | 95 | 95 | 95 | 95 | 95 | 94 | 94 |
|  | Appearance | Silver | — | ○ | ○ | ○ | ○ | ○ | ○ | Δ |

Ex.: Example,
C. Ex.: Comparative Example

TABLE 3

| Items | | Unit | Ex. 7 | Ex. 8 | Ex. 9 | Ex. 10 | Ex. 11 | Ex. 12 |
|---|---|---|---|---|---|---|---|---|
| Component A | A-1 | Parts by Weight | 80 | 80 | 80 | 80 | 80 | 80 |
| Component B | B-1 | Parts by Weight | 20 | 20 | 20 | 20 | 20 |  |
|  | B-2 | Parts by Weight |  |  |  |  |  | 20 |
|  | B-3 | Parts by Weight |  |  |  |  |  |  |
|  | B-4 | Parts by Weight |  |  |  |  |  |  |
|  | B-5 | Parts by Weight |  |  |  |  |  |  |
| Total of the Above Components |  | Parts by Weight | 100 | 100 | 100 | 100 | 100 | 100 |
| Component D | D-1 | Parts by Weight |  | 0.03 | 0.05 | 0.03 | 0.03 | 0.03 |
| Component E | E-1 | Parts by Weight |  | 0.4 | 0.4 | 0.4 |  | 0.4 |
|  | E-2 | Parts by Weight |  |  |  |  | 0.8 |  |
| Others | HP | Parts by Weight | 0.05 | 0.05 | 0.05 | 0.05 | 0.05 | 0.05 |
|  | VP | Parts by Weight | 0.3 | 0.3 | 0.3 | 0.3 | 0.3 | 0.3 |
|  | CE | Parts by Weight |  |  |  | 0.15 |  |  |
|  | PSR | Parts by Weight | 0.03 | 0.03 | 0.03 | 0.03 | 0.03 | 0.03 |
| Properties | Reflectivity | % | 95 | 95 | 95 | 95 | 95 | 95 |
|  | Thermal Stability | ΔMv | — | 300 | 400 | 600 | 600 | 300 | 300 |
|  | Evaluation of | L Value | — | 95 | 95 | 94 | 95 | 95 | 94 |
|  | Appearance | Silver | — | ○ | ○ | ○ | ○ | ○ | ○ |

| Items | | Unit | C. Ex. 2 | C. Ex. 3 | C. Ex. 4 | C. Ex. 5 |
|---|---|---|---|---|---|---|
| Component A | A-1 | Parts by Weight | 80 | 80 | 80 | 80 |
| Component B | B-1 | Parts by Weight |  |  |  |  |
|  | B-2 | Parts by Weight |  |  |  |  |

TABLE 3-continued

|  |  |  | | | | |
|---|---|---|---|---|---|---|
| | B-3 | Parts by Weight | 20 | 20 | | |
| | B-4 | Parts by Weight | | | 20 | |
| | B-5 | Parts by Weight | | | | 20 |
| Total of the Above Components | | Parts by Weight | 100 | 100 | 100 | 100 |
| Component D | D-1 | Parts by Weight | | 0.03 | 0.03 | 0.03 |
| Component E | E-1 | Parts by Weight | | 0.4 | 0.4 | 0.4 |
| | E-2 | Parts by Weight | | | | |
| Others | HP | Parts by Weight | 0.05 | 0.05 | 0.05 | 0.05 |
| | VP | Parts by Weight | 0.3 | 0.3 | 0.3 | 0.3 |
| | CE | Parts by Weight | | | | |
| | PSR | Parts by Weight | 0.03 | 0.03 | 0.03 | 0.03 |
| Properties | Reflectivity | % | 96 | 95 | 95 | 96 |
| | Thermal Stability ΔMv | | — | 1,000 | 1,400 | 1,200 | 800 |
| | Evaluation of L Value | | 96 | 95 | 95 | 96 |
| | Appearance Silver | | — | X | X | Δ | Δ |

Ex.: Example,
C. Ex.: Comparative Example

TABLE 4

| Items | | Unit | Ex. 13 | C. Ex. 6 |
|---|---|---|---|---|
| Component A | A-1 | Parts by Weight | 75 | 75 |
| Component B | B-1 | Parts by Weight | 25 | |
| | B-2 | Parts by Weight | | |
| | B-3 | Parts by Weight | | 25 |
| | B-4 | Parts by Weight | | |
| | B-5 | Parts by Weight | | |
| Total of the Above Components | | Parts by Weight | 100 | 100 |
| Component D | D-1 | Parts by Weight | 0.03 | 0.03 |
| Component E | E-1 | Parts by Weight | 0.4 | 0.4 |
| | E-2 | Parts by Weight | | |
| Others | HP | Parts by Weight | 0.05 | 0.05 |
| | VP | Parts by Weight | 0.3 | 0.3 |
| | CE | Parts by Weight | | |
| | PSR | Parts by Weight | 0.03 | 0.03 |
| Properties | Reflectivity | % | 95 | 96 |
| | Thermal Stability ΔMv | | 800 | 1,800 |
| | Evaluation of L Value | | 95 | 95 |
| | Appearance Silver | | ○ | X |

Ex.: Example,
C. Ex.: Comparative Example

As is obvious from Tables 2 to 4, it is understood that the resin composition of the present invention has excellent light reflectivity and thermal stability. That is, it is understood that the resin composition has properties suitable for a light reflection material.

Example 14

By use of the pellets obtained in Example 2, a light reflection plate for an LED array backlight having a bottomed lattice shape having a length of 6 cm and a width of 4 cm shown in FIG. 1 was molded by using the same molding machine and temperature conditions as used in the above Example 1, a white LED was attached in each block to prepare a backlight, and a liquid crystal display was prepared by replacing a backlight unit for a liquid crystal display used in a cellular phone by the above prepared backlight. Displayed images appeared to be very sharp.

Example 15

By use of the pellets obtained in Example 8, a backlight was prepared in the same manner as in Example 14, and a liquid crystal display which displayed sharper images than Example 14 was obtained.

Examples 16 to 19

To polycarbonate resin powder produced from bisphenol A and phosgene by interfacial condensation polymerization, various additives shown in Table 5 were added in respective amounts, and they were blended by a blender and melt-kneaded by use of a vented twin-screw extruder (TEX30α (complete engagement, spinning in the same direction, two-thread screws) of Japan Steel Works, Ltd.) to obtain pellets. As for additives other than titanium dioxide pigments, pre-mixtures of the additives in concentrations which were 10 times their respective amounts and the polycarbonate resin powder were prepared by use of a Henschel mixer, and all the materials were then mixed together by a blender. Extrusion conditions comprised a discharge rate of 20 kg/h, a screw rotation speed of 150 rpm, and a vacuum degree of the vent of 3 kPa. Further, the extrusion temperature was 260° C. from the first supply port to the die.

After the obtained pellets were dried by a hot air circulation type dryer at 120° C. for 6 hours, test pieces in the form of smooth and flat plates which had a length of 90 mm, a width of 50 mm, a thickness of 2 mm and an arithmetic mean surface roughness (Ra) of 0.03 μm were molded by use of an injection molding machine (SG-150U of Sumitomo Heavy Industries, Ltd.) at a cylinder temperature of 280° C., a mold temperature of 70° C. and an injection rate of 50 mm/sec. The results of evaluations of the obtained molded plates are shown in Table 5.

TABLE 5

| Items | | Unit | Ex. 16 | Ex. 17 | Ex. 18 | Ex. 19 |
|---|---|---|---|---|---|---|
| Component A | A-1 | Parts by Weight | 90 | 90 | 80 | 80 |
| | A-2 | Parts by Weight | | | | |
| Component B | B-1 | Parts by Weight | 10 | 10 | 20 | 20 |
| | B-3 | Parts by Weight | | | | |
| Total of the Above Components | | Parts by Weight | 100 | 100 | 100 | 100 |
| Component C | C-1 | Parts by Weight | 0.1 | 0.3 | 0.1 | 0.1 |
| Component D | D-1 | Parts by Weight | 0.03 | 0.05 | | 0.03 |
| Component E | E-1 | Parts by Weight | 0.4 | 0.4 | | 0.4 |
| Others | HP | Parts by Weight | 0.05 | 0.05 | 0.05 | 0.05 |
| | CE | Parts by Weight | | | | |
| | PSR | Parts by Weight | 0.03 | 0.03 | 0.03 | 0.03 |
| Properties | Reflectivity | % | 94 | 94 | 95 | 95 |
| | Thermal Stability ΔMv | — | 100 | 200 | 100 | 300 |
| | Evaluation of L Value | — | 95 | 95 | 95 | 95 |
| | Appearance Silver | — | ○ | ○ | ○ | ○ |

Ex.: Example

As is obvious from Table 5, it is understood that the resin composition of the present invention has excellent light reflectivity and thermal stability. That is, it is understood that the resin composition has properties suitable for a light reflection material.

Example 20

By use of the pellets obtained in Example 16, a light reflection plate for an LED array backlight having a bottomed lattice shape having a length of 6 cm and a width of 4 cm shown in FIG. 1 was molded by using the same molding machine and temperature conditions as used in the above Example 16, a white LED was attached in each block to prepare a backlight, and a liquid crystal display was prepared by replacing a backlight unit for a liquid crystal display used in a cellular phone by the above prepared backlight. Displayed images appeared to be very sharp.

Example 21

By use of the pellets obtained in Example 19, a backlight was prepared in the same manner as in Example 20, and a liquid crystal display which displayed sharper images than Example 20 was obtained.

EFFECT OF THE INVENTION

According to the production method of resin composition of the present invention, a resin composition can be provided that comprises a polycarbonate resin and a titanium dioxide pigment and is excellent in thermal stability, light reflectivity and color, and preferably in flame retardancy.

Further, according to the present invention, pellets and molded articles can be provided that are excellent in thermal stability, light reflectivity and color, and preferably in flame retardancy.

Further, according to the method for preventing a decrease in the molecular weight of a resin composition according to the present invention, a decrease in the molecular weight by heat history of a resin composition comprising a polycarbonate resin and a titanium dioxide pigment can be prevented, and pellets and molded articles that are excellent in thermal stability, light reflectivity and color, and preferably in flame retardancy, can be provided.

INDUSTRIAL FEASIBILITY

The resin composition according to the present invention can be suitably used for various light reflection materials such as a lamp reflector. For example, the resin composition can be suitably used for reflectors for illuminating lamps such as fluorescent lamps, reflectors for backlights for various displays such as liquid crystal displays, reflectors for switches, reflectors for LED arrays, and reflectors having a combination of these functions.

The invention claimed is:

1. A resin composition, comprising 60 to 99.9 parts by weight of a polycarbonate resin (component A) and 0.1 to 40 parts by weight of a surface-treated titanium dioxide pigment (component B), wherein component B
   (i) satisfies $0.15 \leq (b)-(a) \leq 0.3$, when weight reduction at 23 to 100° C. by thermogravimetric analysis (TGA) is (a) wt % and weight reduction at 23 to 300° C. by TGA is (b) wt %,
   (ii) satisfies $0.003 \leq (d)/(c) \leq 0.01$ and $0.005 \leq (e)/(c) \leq 0.02$, when weight percentages derived from Ti, Al and Si elements in X-ray fluorescence analysis are (c) wt %, (d) wt % and (e) wt %, respectively, and
   (iii) has a coating of an aluminum oxide, a silicon oxide and an alkyl hydrogen siloxane in this order from the surface of the titanium dioxide made by a chlorine method.

2. The resin composition of claim 1, wherein the average particle diameter of component B is 0.01 to 0.4 μm.

3. The resin composition of claim 1, wherein the average particle diameter of component B is 0.15 to 0.25 μm.

4. The resin composition of claim 1, wherein component B has a rutile crystal form.

5. The resin composition of claim 1, further comprising mixing 0.001 to 5 parts by weight of an acid-group-containing organic compound (component C) based on 100 parts by weight of the total of components A and B.

6. The resin composition of claim 5, wherein component C is olefinic wax having a carboxyl group and/or a carboxylic anhydride group.

7. The resin composition of claim 1, further comprising 0.0001 to 2 parts by weight of an alkali metal or alkali earth metal sulfonate (component D) based on 100 parts by weight of the total of components A and B.

8. The resin composition of claim 1, further comprising 0.05 to 1 part by weight of a fluorine-containing polymer capable of fibril formation (component E) based on 100 parts by weight of the total of components A and B.

9. The resin composition of claim 1, wherein the proportions of components A and B are 70 to 90 parts by weight of component A and 10 to 30 parts by weight of component B.

10. A method for preventing a decrease in the molecular weight of a resin composition comprising a polycarbonate resin (component A) and a titanium dioxide pigment (component B), the composition using, as component B, a surface-treated titanium dioxide pigment which:

(i) satisfies $0.15 \leq (b)-(a) \leq 0.3$, when weight reduction at 23 to 100° C. by thermogravimetric analysis (TGA) is (a) wt % and weight reduction at 23 to 300° C. by TGA is (b) wt %, (ii) satisfies $0.003 \leq (d)/(c) \leq 0.01$ and $0.005 \leq (e)/(c) \leq 0.02$, when weight percentages derived from Ti, Al and Si elements in X-ray fluorescence analysis are (c) wt %, (d) wt % and (e) wt %, respectively, and (iii) has a coating of an aluminum oxide, a silicon oxide and an alkyl hydrogen siloxane in this order from the surface of the titanium dioxide made by a chlorine method.

11. The method of claim 10, wherein the average particle diameter of component B is 0.01 to 0.4 μm.

12. The method of claim 10, wherein the average particle diameter of component B is 0.15 to 0.25 μm.

13. The method of claim 10, wherein component B has a rutile crystal form.

* * * * *